United States Patent
Luzaich

(10) Patent No.: US 11,001,424 B2
(45) Date of Patent: May 11, 2021

(54) REUSABLE CLOSURE

(71) Applicant: Gregory John Luzaich, Windsor, CA (US)

(72) Inventor: Gregory John Luzaich, Windsor, CA (US)

(73) Assignee: ZERO OXYGEN SOLUTIONS, INC., Windsor, CA (US)

( * ) Notice: Subject to any disclaimer, the term of this patent is extended or adjusted under 35 U.S.C. 154(b) by 422 days.

(21) Appl. No.: 14/615,340

(22) Filed: Feb. 5, 2015

(65) Prior Publication Data
US 2015/0217912 A1 Aug. 6, 2015

Related U.S. Application Data

(60) Provisional application No. 62/123,809, filed on Nov. 29, 2014, provisional application No. 61/966,564, (Continued)

(51) Int. Cl.
*B65D 51/24* (2006.01)
*B65D 39/00* (2006.01)
(Continued)

(52) U.S. Cl.
CPC ....... *B65D 51/244* (2013.01); *B65D 39/0076* (2013.01); *B65D 79/02* (2013.01); *Y02W 30/80* (2015.05)

(58) Field of Classification Search
CPC ................ B65D 51/244; B65D 81/266; B65D 39/0076; B65D 39/0058; B65D 51/16; B65D 79/02; Y02W 30/807; B65B 25/001
(Continued)

(56) References Cited

U.S. PATENT DOCUMENTS 3,220,555 A 11/1965 Silha
3,271,856 A 9/1966 Rowley
(Continued)

FOREIGN PATENT DOCUMENTS

CN 1468190 A 1/2004
CN 102211297 A 10/2011
(Continued)

OTHER PUBLICATIONS

Notification Concerning Transmittal of International Preliminary Report on Patentability issued for International Patent Application No. PCT/US2015/014888, dated Aug. 18, 2016, 14 pages.
(Continued)

*Primary Examiner* — Andrew M Tecco
*Assistant Examiner* — Nicholas E Igbokwe
(74) *Attorney, Agent, or Firm* — Womble Bond Dickinson (US) LLP

(57) ABSTRACT

A preservation apparatus and method for using the same are disclosed herein. In one embodiment, the preservation apparatus comprising: a removable closure adapted to fit together in sealed relationship with a first container for containing an item, where the removable closure comprises a second container to contain a substance operable to collect oxygen molecules contained within the first container. The preservation apparatus also comprises a removable cap adapted to cover a portion of the removable closure including the second container, in order prevent the second container from being exposed to oxygen molecules outside the cap.

26 Claims, 19 Drawing Sheets

Related U.S. Application Data filed on Feb. 25, 2014, provisional application No. 61/965,805, filed on Feb. 6, 2014, provisional application No. 61/965,804, filed on Feb. 6, 2014.

(51) Int. Cl.
*B65D 51/16* (2006.01)
*B65D 51/28* (2006.01)
*B65D 79/02* (2006.01)

(58) Field of Classification Search
USPC ............... 53/400, 428, 484, 485; 220/254.1; 215/316
See application file for complete search history.

(56) References Cited

U.S. PATENT DOCUMENTS

| | | | | |
|---|---|---|---|---|
| 4,287,995 | A * | 9/1981 | Moriya | B65D 47/242 |
| | | | | 215/228 |
| 4,756,436 | A * | 7/1988 | Morita | B65D 51/244 |
| | | | | 215/228 |
| D313,540 | S | 1/1991 | Toor et al. | |
| 5,215,129 | A * | 6/1993 | Berresford | B65B 31/047 |
| | | | | 141/65 |
| 5,365,881 | A | 11/1994 | Sporn | |
| 5,413,827 | A * | 5/1995 | Brodie, III | B65D 81/28 |
| | | | | 428/213 |
| 5,475,894 | A | 12/1995 | Wildfoerster | |
| 5,803,282 | A * | 9/1998 | Chen | B65B 31/047 |
| | | | | 110/272 |
| 5,934,494 | A | 8/1999 | Takahashi et al. | |
| D422,191 | S | 4/2000 | Usbeck | |
| 6,502,314 | B1 | 1/2003 | McCatty | |
| 6,595,109 | B2 * | 7/2003 | Liebmann, Jr. | B65B 31/046 |
| | | | | 141/59 |
| 7,743,796 | B1 * | 6/2010 | Schooley | B65D 39/0052 |
| | | | | 141/351 |
| 8,474,354 | B2 | 7/2013 | Horton | |
| 2005/0133396 | A1 | 6/2005 | Daykin | |
| 2005/0173668 | A1 | 8/2005 | Van Zijll Langhout et al. | |
| 2007/0199612 | A1 * | 8/2007 | Larimer | B65D 81/2038 |
| | | | | 141/65 |
| 2008/0272085 | A1 * | 11/2008 | Laporta | B65D 39/0052 |
| | | | | 215/296 |
| 2008/0290118 | A1 * | 11/2008 | Luzaich | B65D 39/0052 |
| | | | | 222/152 |
| 2010/0006603 | A1 * | 1/2010 | Weinberg | B67D 1/0418 |
| | | | | 222/152 |
| 2010/0140116 | A1 * | 6/2010 | Stiene | B65D 81/266 |
| | | | | 206/204 |
| 2011/0126939 | A1 * | 6/2011 | Luis | B65B 31/047 |
| | | | | 141/65 |
| 2011/0139670 | A1 * | 6/2011 | Ciaramitaro | B65D 47/0804 |
| | | | | 206/524.1 |
| 2011/0223068 | A1 * | 9/2011 | Offord | A23L 3/3418 |
| | | | | 422/119 |
| 2011/0278256 | A1 * | 11/2011 | Suh | B65D 39/0023 |
| | | | | 215/355 |
| 2012/0273491 | A1 * | 11/2012 | Hoffmann | A61J 1/062 |
| | | | | 220/254.1 |
| 2012/0274470 | A1 * | 11/2012 | Sandvick | G08B 5/36 |
| | | | | 340/584 |
| 2012/0305519 | A1 * | 12/2012 | Lee | B65D 51/2835 |
| | | | | 215/316 |
| 2014/0312000 | A1 | 10/2014 | Xu et al. | |
| 2015/0217912 | A1 | 8/2015 | Luzaich | |

FOREIGN PATENT DOCUMENTS

| | | |
|---|---|---|
| CN | 102241297 A | 11/2011 |
| JP | 2005-132475 A | 5/2005 |
| JP | 2006143238 | 6/2006 |
| JP | 2006143238 A * | 6/2006 |
| JP | 20060143238 A | 8/2006 |
| KR | 10-1251770 B1 | 5/2013 |
| WO | 2005/068315 A1 | 7/2005 |
| WO | 2011/014790 A1 | 2/2011 |
| WO | 2015/120313 A1 | 8/2015 |

OTHER PUBLICATIONS

PCT Appln. No. PCT/US2015/014888 International Search Report, dated May 21, 2015, 16 pgs.
Supplementary European Search Report for European Patent Application No. EP15745958 dated Oct. 13, 2016.
Summary of the First Office Action dated Nov. 3, 2017, for Chinese Patent Application No. 2015800167106.
Office Action received for European Patent Application No. 15745958.7, dated Jun. 21, 2017, 8 pages.
Office Action received for European Patent Application No. 15745958.7, dated Feb. 6, 2018, 6 pages.
Office Action received for European Patent Application No. 15745958.7, dated Aug. 24, 2018, 5 pages.
European Written Opinion received for EP Patent Application No. 15745958.7, dated Oct. 21, 2016, 6 pages.
Office Action Received for Australian Patent Application No. 2015213774, dated Jun. 21, 2017, 5 pages.
Japanese Registered Design Patent No. 1359687.
Japanese Registered Design Patent No. 1445168.
Japanese Office Action dated Jun. 14, 2019 for Japanese Patent Application No. 2016-568469.
Chinese Office Action dated Jul. 18, 2018 for Chinese Application No. 201580016710.6.

* cited by examiner

SECTION A-A

DETAIL B
SCALE 4 : 1

DETAIL B
SCALE 4 : 1

DETAIL B
SCALE 4 : 1

DETAIL B
SCALE 4 : 1

REUSABLE CLOSURE

PRIORITY

The present patent application claims priority to and incorporates by reference the corresponding provisional patent applications Ser. No. 61/965,804, titled, "Visual Indicating Removable and Reusable Perishable Substance Closure," filed on Feb. 6, 2014, Ser. No. 61/965,805, titled, "Electronic Visual Indicating Removable and Reusable Perishable Substance Closure," filed on Feb. 6, 2014, Ser. No. 61/966,564, titled, "Visual Indicating Removable and Reusable Perishable Substance Closure," filed on Feb. 25, 2014, and Ser. No. 62/123,809, titled, "CIP2 Visual Indicating Removable and Reusable Perishable Substance Closure," filed on Nov. 29, 2014.

FIELD OF THE INVENTION

Embodiments of the present invention relates to the field of preservation; more particularly, embodiments the present invention relates to a removable closure device for use in the storage of an opened container of an item (e.g., a perishable item such as, for example, wine in a wine bottle whose cork has been removed).

BACKGROUND OF THE INVENTION

Virtually anyone who routinely drinks wine notices that if a bottle of wine is uncorked and not completely consumed, the wine contained within the bottle changes in its physical and chemical characteristics making the wine much less enjoyable to consume as time passes. This is caused by oxidation, that is, the bonding of oxygen molecules to oxidizable compounds present within the wine. Oxidation of wine results in the production of brown compounds and browning of red pigments with loss of color. It further results in the production of aldehydes and desirable grape (primary), fermentation (secondary) and aging (tertiary) derived flavors. The product of new and desirable flavor compounds can mask the desirable flavor compounds.

Such oxidizable compounds in wine include phenolics, alcohols and some aldehyde compounds. Although wines suffer from oxidation, because of the high concentration of phenolics extracted from the grape skins during red wine production, red wine has a high reserve of oxidizable compounds and hence appears more sensitive to oxidative spoilage. Sulfur dioxide added to red wine loosely binds to red wine pigments decolorizing the pigment molecules and rendering a portion of the sulfur dioxide ineffective. The sulfur dioxide is also used to inhibit microbial growth and is thus a highly desirable additive for use in red wines.

It has thus been recognized to be highly desirable to limit or entirely prevent oxygen, such as that contained in ambient air, from contacting the surface of a food product, such as wine, in order to maintain the product's desirable flavor and other physical characteristics.

There have been rather rudimentary attempts to inject an inert gas in the free space of an opened wine bottle in order to displace air. Such devices generally are in the form of a syringe like product which enables the user to withdraw air from the bottle's free space to inject a gas therein. Once the gas is injected in to the bottle, it combines with the existing air. Since air is approximately 21%, the oxygen atoms become mixed with the inert gas. Such mixing makes it very difficult to remove all of the oxygen atoms from the bottle without apply tremendous amounts of inert gas. Even at small percentages of oxygen there are huge numbers of oxygen atoms which cause the wine to oxidize and degrade.

SUMMARY OF THE INVENTION

A preservation apparatus and method for using the same are disclosed herein. In one embodiment, the preservation apparatus comprises a removable closure adapted to fit together in sealed relationship with a first container for containing an item, where the removable closure comprises a second container to contain a substance operable to collect oxygen molecules contained within the first container and render them harmless to the item. The preservation apparatus also comprises a removable cap adapted to cover a portion of the removable closure including the second container, in order to prevent the second container from being exposed to oxygen molecules outside the cap.

In another embodiment, the preservation apparatus comprising a removable closure adapted to fit together in sealed relationship with a first container for containing an item, where the removable closure comprises a second container to contain a substance operable to collect a type of molecule contained within the first container and render them harmless to the item, wherein the second container comprises a material that allows molecules of the type to pass through to at least a portion of the second container and chemically react with the substance while preventing the item from entering the interior of the second container. The preservation apparatus also comprises a removable cap adapted to cover a portion of the removable closure including the second container, in order prevent the second container from being exposed to molecules of the type outside the cap.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
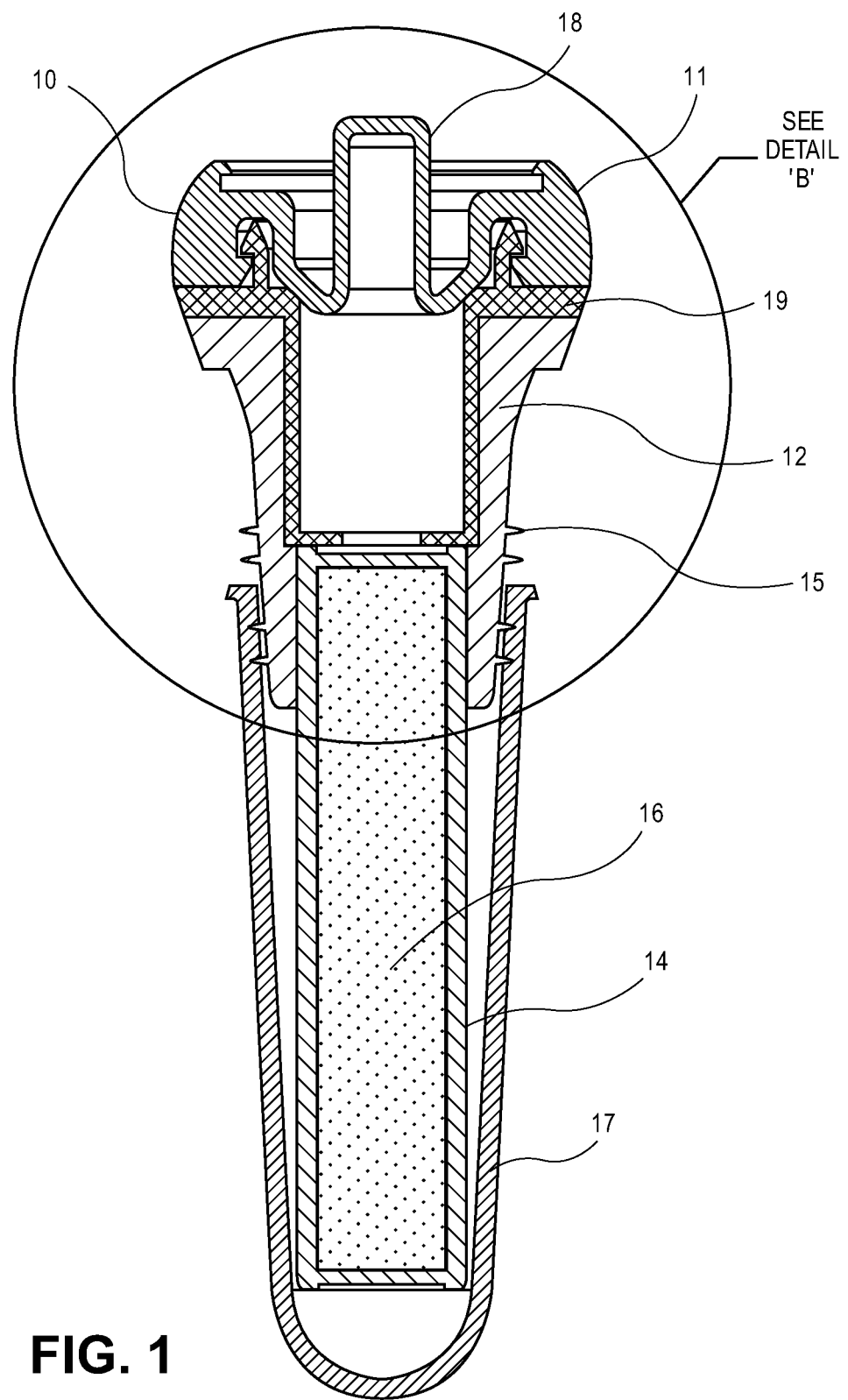
FIG. 1 is a cross sectional view of one embodiment of a closure device in a storage configuration with a cap attached thereto.

Embodiments of a preservation apparatus are disclosed herein that aid in the preservation of wine and other perishable substances in vessels which have been opened previously and does so conveniently. Embodiments of the invention can be used on many other substances besides wine, including, but not limited to, other alcoholic beverages, cooking oils, liquids, foods, beer, spirits, and liquids in many phases of the alcoholic beverage production process.

The closure devices disclosed herein may be applicable to any container (e.g., wine bottle, food container, etc.) and can greatly suppress or eliminate the degradation (e.g., oxidation) of the item (e.g., wine) contained therein. Furthermore, the closure devices described herein has the ability to be reused many times. Such a feature significantly increases the performance and economics of the closure device.

In one embodiment, removable closure device is sized to fit within the neck of an opened wine bottle or container storing a perishable item. In one embodiment, the closure device includes a neck portion joined to a head portion, the latter extending into the wine bottle during use. In use, a container such as a cartridge (e.g., canister-shaped cartridge, cage, etc.) within the closure device contains a substance that renders degradation causing molecules (e.g., oxygen, aldehydes, other substance known to deteriorate wine or other perishable item or are a byproduct of the wine deteriorative process, etc.) harmless. In one embodiment, the substance does this by collecting or absorbing such molecules into the substance via a chemical reaction between the molecules and the substance. When the removable closure is inserted into a container (e.g., a bottle) having a perishable item, the cartridge (or other container) having the substance that collects and renders harmless degradation-causing molecules becomes located in the headspace above the perishable item. The cartridge has a sidewall and/or end caps that are designed to allow the harmful (e.g., oxygen) molecules to pass through to and react with the substance within the cartridge to collect and thus render harmless such molecules. When potentially harmful molecules (e.g., oxygen molecules, aldehydes, etc.) make contact with the substance of the cartridge, a chemical reaction occurs between the two, thus rendering the harmful substance inert or far less harmful. In the case of oxygen, the oxygen atoms travel at a very high rate of speed and eventually within hours most will collide and enter the cartridge and chemically react with the substance contained therein.

In one embodiment, when the removable closure is initially inserted into a bottle or other container, the atmosphere is at a standard pressure of approximately 14.7 psi and a standard oxygen concentration of 20.9% at sea level. Once inserted, the closure device forms a gas tight seal with the wine bottle that thoroughly deters any air, oxygen or other gas from entering the bottle. In the case of oxygen being the harmful substance, within a few hours' time, the oxygen molecules are rendered harmless and eliminated from the headspace above perishable item. That is, the oxygen concentration becomes zero, leaving an atmosphere in the headspace consisting primarily of nitrogen due to the fact that air is primarily composed of nitrogen and oxygen. The chemical reaction with the oxygen molecules creates a vacuum inside the bottle, which steadily increases as the oxygen concentration in the bottle decreases. With respect to the oxygen molecules, the maximum vacuum is achieved when all of the oxygen molecules have been collected or absorbed into the substance.

In one embodiment, the vacuum inside the bottle creates enough force on the inside of the stopper to actuate a flexible cap or other mechanism included in the structure of the removable closure. This cap changes position with the increase of the vacuum inside the bottle (container). The change in position provides a visual indicator that the oxygen molecules are being or have been rendered harmless, indicating the contents of the container to be preserved.

In one embodiment, the reusable closure device visually indicates that such substances as oxygen, aldehydes and other substances which contribute to the degradation of an item (e.g., a perishable item) are being removed from a container (e.g., the headspace of the bottle), thus rendering them ineffective and thus visually indicating the status of the preservation of the wine or perishable substance.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Overview

In one embodiment, the preservation apparatus comprising a removable closure adapted to fit together in sealed relationship with a first container for containing an item, where the removable closure comprises a second container (e.g., cartridge, cage, etc.) to contain a substance operable to collect a type of molecule (e.g., oxygen molecules, aldehyde, etc.) contained within the first container to render those molecules harmless to the item. In one embodiment, the molecules are rendered harmless to the item in the container because those molecules are kept away from and/or can no longer interact with the item. In one embodiment, a vacuum is created in a portion of the first container sealed by the removable closure and the vacuum pressure increases as more of the oxygen molecules are rendered harmless. In one embodiment, the second container comprises a material that allows molecules of the type to pass through to at least a portion of the second container and chemically react with the substance while preventing the item from entering the interior of the second container. In one embodiment, the material comprises porous plastic, Tyvek, or another porous material.

The preservation apparatus also comprises a removable cap adapted to cover a portion of the removable closure having the second container, in order to prevent the second container from being exposed to molecules of the type (e.g., oxygen molecules) outside the cap. In one embodiment, the cap is adapted for coupling to the removable closure when the removable closure is in sealed relationship with the first container (e.g., a cartridge with a oxygen collecting or absorbing substance) in a manner that prevents oxygen in the first container from chemically reacting with the substance. For example, the cap may cover a cartridge containing such a substance while the removable closure is inserted into a wine bottle. In such a case, the removable closure device acts as a wine stopper yet the substance is not performing oxygen collecting or absorption on oxygen molecules within the wine bottle. In another embodiment, the cap is adapted for coupling to the removable closure when the removable closure is in sealed relationship with the first container in a manner that does not impede oxygen in the first container from chemically reacting with the substance. For example, the cap may be attached to the top of the removable closure device while the removable closure device is within a container and is collecting or absorbing oxygen molecules within the container using such a substance.

In one embodiment, the second container containing the substance to render certain molecules harmless is removably coupled with the removable closure. This facilitates replacing this container. Such may be necessary in embodiments where the substance needs to be replaced because the substance no longer chemically reacts with the harmless molecules.

In one embodiment, the substance to render harmful molecules harmless is packaged in a sachet within a container and further wherein the removable closure includes a top portion removably coupled to this container for use in replacing the sachet. Such a top portion when opened would allow access to the sachet to insert and/or replace the sachet.

FIGS. 1-7 illustrate one embodiment of a closure device. Referring to FIGS. 1-7, closure 10 includes a head portion 11, closure neck 12, annular sealing rings 15, cartridge 14, and structural support 19. Head portion 11 is coupled to structural support 19, which is coupled to closure neck 12. In one embodiment, head portion 11, structural support 19 and closure neck 12 are sealed together to form a gas tight seal between the components, thus preventing the permeation of oxygen or other molecules in to or out of closure 10.

Cartridge 14 includes a substance 16 that collects molecules that are considered harmful to an item stored in a container and thus renders them harmless to that item. That is, cartridge 14 contains a substance operable to render a type of molecule (e.g., oxygen molecules, aldehyde, nitrogen, etc.) contained within a vessel, such as vessel 20, harmless. In one embodiment, the substance collects or absorbs such molecules and keeps them in cartridge 14. There are a number of oxygen absorbing or scavenging materials that are well-known in the art that may be used as the substance. In one embodiment, the substance is an iron-oxide based substance that collects oxygen molecules. In another embodiment, the substance is an aldehyde collecting, absorbing or neutralizing substance (e.g., Kirakuru aldehyde scavenger from NICCA USA or any other commercially available aldehyde scavenger). In yet another embodiment, the substance includes an oxygen absorbing, or collecting, substance and an aldehyde absorbing substance in cartridge 14, including, but not limited to, those described above. At the same time the substance is collecting harmful molecules, a vacuum is created in the vessel.

In one embodiment, cartridge 14 is sized such that it has the capacity to eliminate the harmful substances from one or many individual bottles. In one embodiment, cartridge 14 contains enough of the substance used to render oxygen molecules harmless to render 600 cc of oxygen (or 2870 cc air) harmless. In one embodiment, cartridge 14 utilizes the most common package that is used in the scavenger industry. By utilizing such a package, there are several advantages, including great improvement in a faster time to market, an overall improvement in research and development costs, lower production costs, lower retail cost and increased aesthetics and performance.

Cartridge 14 is coupled to head portion 11. In one embodiment, cartridge 14 is removably coupled to head portion 11. This enables cartridge 14 to be replaced, which may be necessary when substance 16 is no longer effective in rendering certain molecules (e.g., oxygen molecules) harmless. For example, cartridge 14 may have threads that allow it to be screwed onto head portion. Alternatively, cartridge 14 may snap onto head portion 11 using a feature similar to cartridge retaining feature 47. In one embodiment, the closure neck of closure 10 comprises Thermoplastic Elastomer to facilitate the snap feature.

In order to activate (turn on) and deactivate (turn off) the preserving capability of substance 16 in cartridge 14, closure 10 includes a sealing cap 17 which is removed during use and replaced into position after use. In one embodiment, sealing cap 17 covers at least a portion of the closure device. Specifically, sealing cap 17 covers cartridge 14 when closure 10 is not in use in preserving an item (e.g., a perishable item). In such a case, annular sealing rings 15 engage with sealing cap 17 when closure 10 is inserted into sealing cap 17. In one embodiment, closure 10 includes a suitable structure to mount sealing cap 17 when closure 10 is in use in preserving an item to prevent the user from losing it. In one embodiment, sealing cap 17 is attached to the top of closure 10 when sealing cap 17 is not covering cartridge 14.

Figure 2:
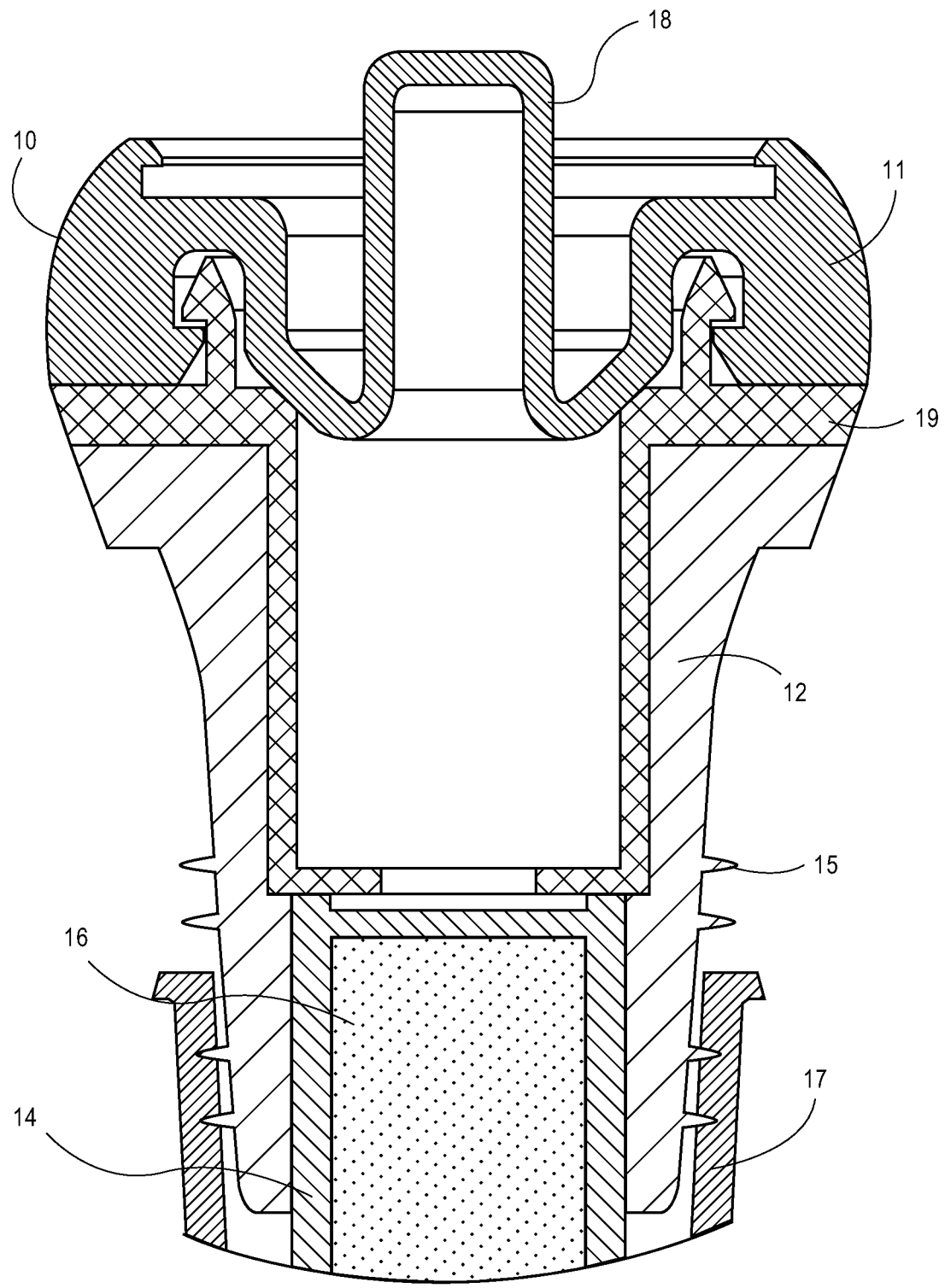
FIG. 2 is detailed cross sectional view of a portion of the closure device of FIG. 1.

FIGS. 1 and 2 illustrate closure 10 inserted into sealing cap 17. One or more of sealing rings 15 engage with the sealing cap 17 in the inserted position. In this position, cartridge 14 is protected from the atmosphere that is external to sealing cap 17. While there may still be harmful molecules (e.g., oxygen molecules) between closure 10 and sealing cap 17 when closure 10 is fully inserted into sealing cap 17, these are quickly rendered harmless due to a chemical reaction between the substance in cartridge 14 and those harmful molecules.

Figure 17:
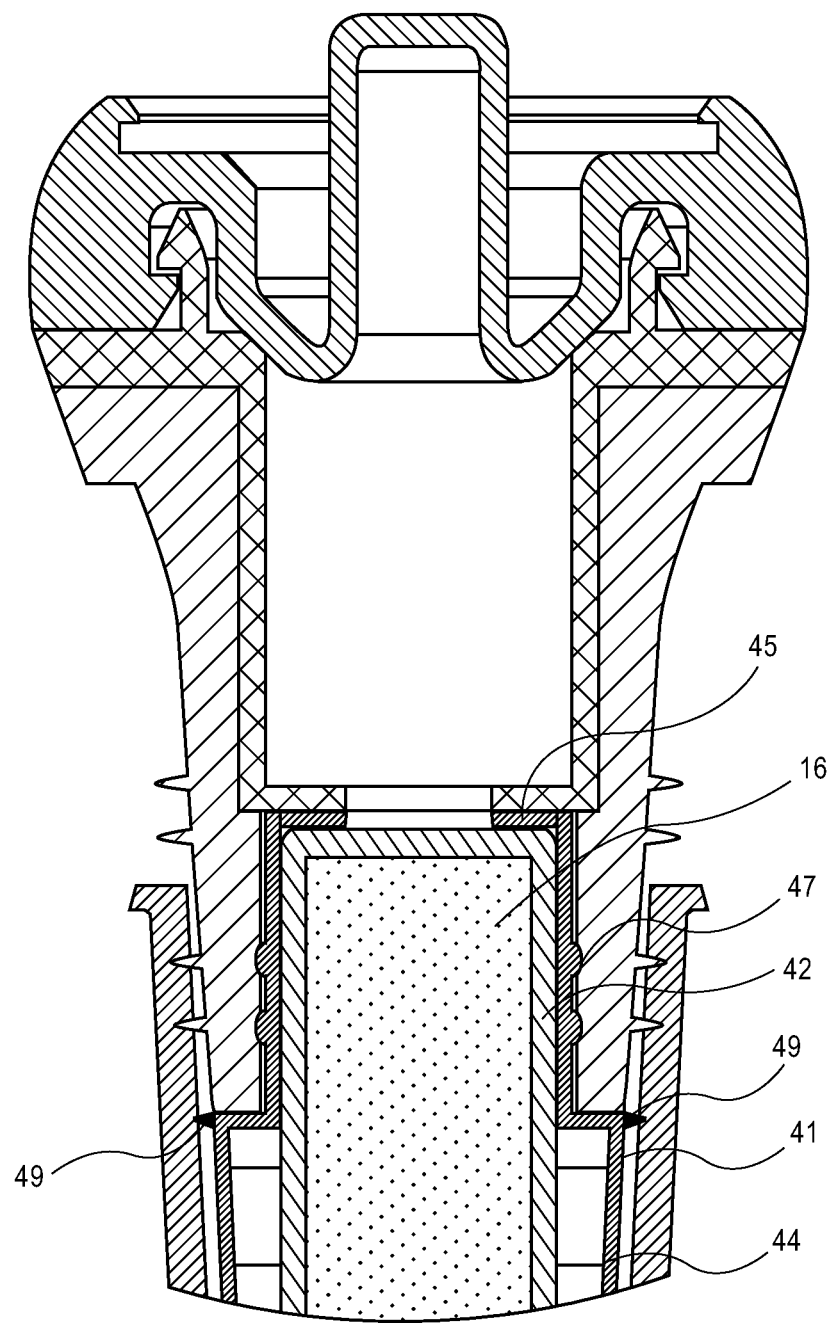
FIG. 17 illustrates one embodiment of a removable closure device with at least one annular sealing ring that engages with a cap when inserted into the cap.
Figure 18:
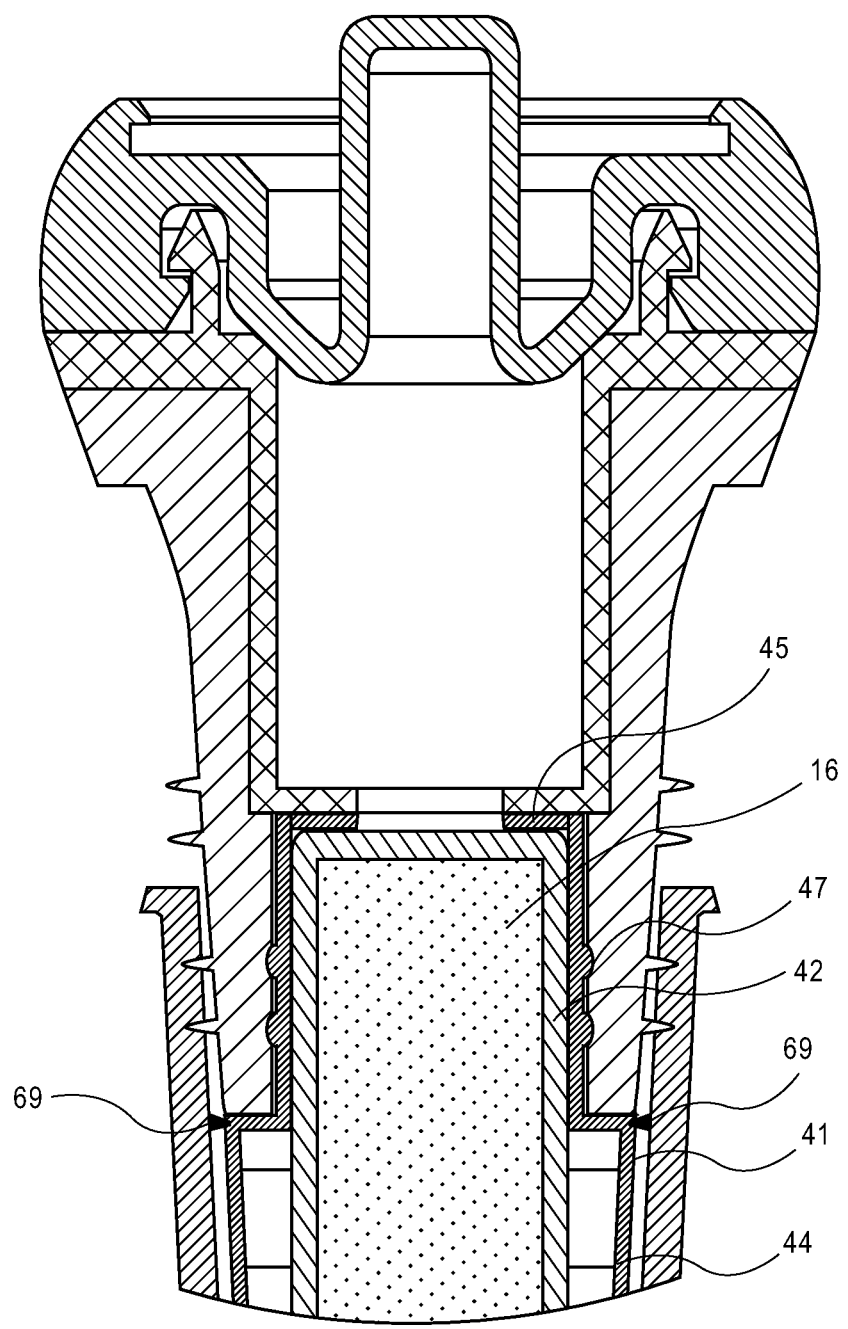
FIG. 18 illustrates one embodiment of a cap with at least one annular sealing ring that engages with a removable closure device when the removable closure device is inserted into the cap.
Figure 19:
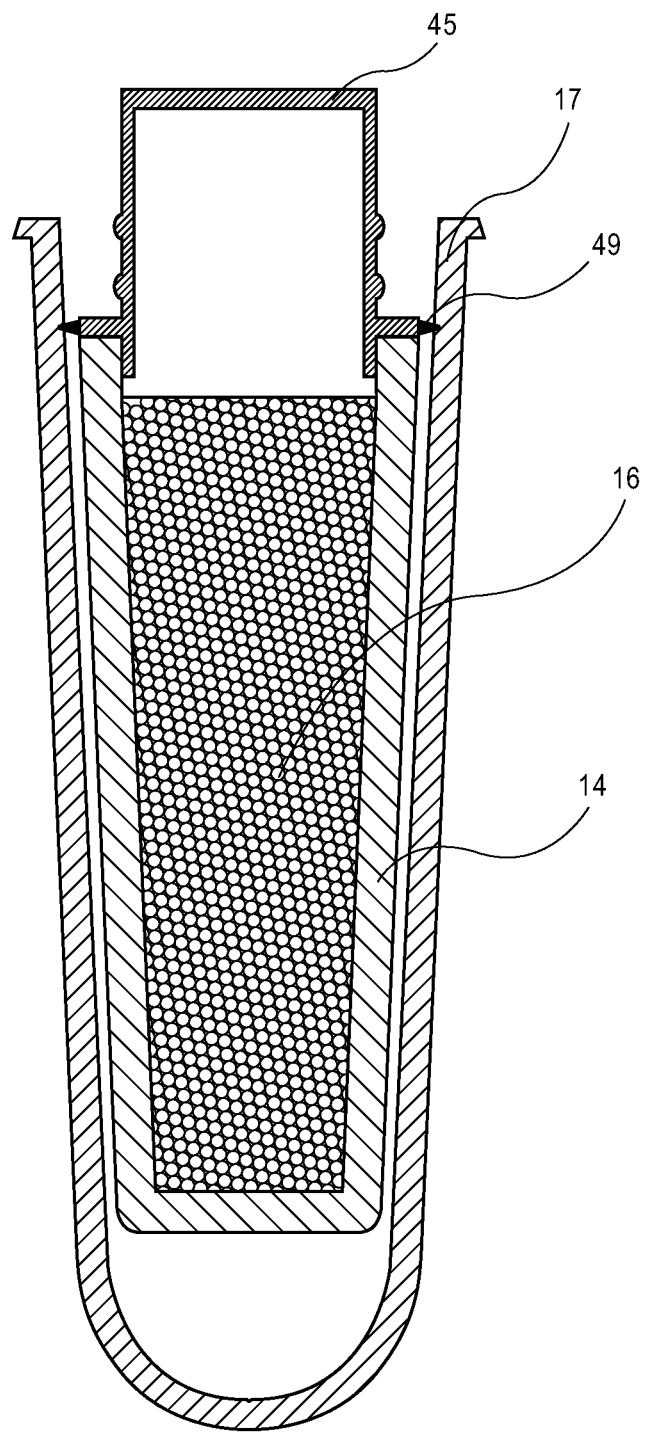
FIG. 19 illustrates another embodiment of a cartridge and a sealing cap covering the cartridge.

In one embodiment, closure 10 includes at least one annular sealing ring located at the top portion of a cartridge (e.g., a cage cartridge described below) to seal the sides of the cartridge to sealing cap 17 when inserted therein. FIG. 17 illustrates one embodiment of a removable closure device with at least one annular sealing ring (49) that engages with a cap when inserted into the cap. In another embodiment, sealing cap 17 includes at least one annular sealing ring 49 located to engage and press against the top portion of a cartridge when the cartridge is inserted into sealing cap 17. FIG. 18 illustrates one embodiment of a cap with at least one annular sealing ring (69) that engages with a removable closure device when the removable closure device is inserted into the cap. FIG. 19 illustrates another embodiment of a cartridge and a sealing cap covering the cartridge. Note that other seals may be used such as, but not limited to, a wiping seal, an O-ring seal, a lip seal, and a compression seal.

Figure 3:
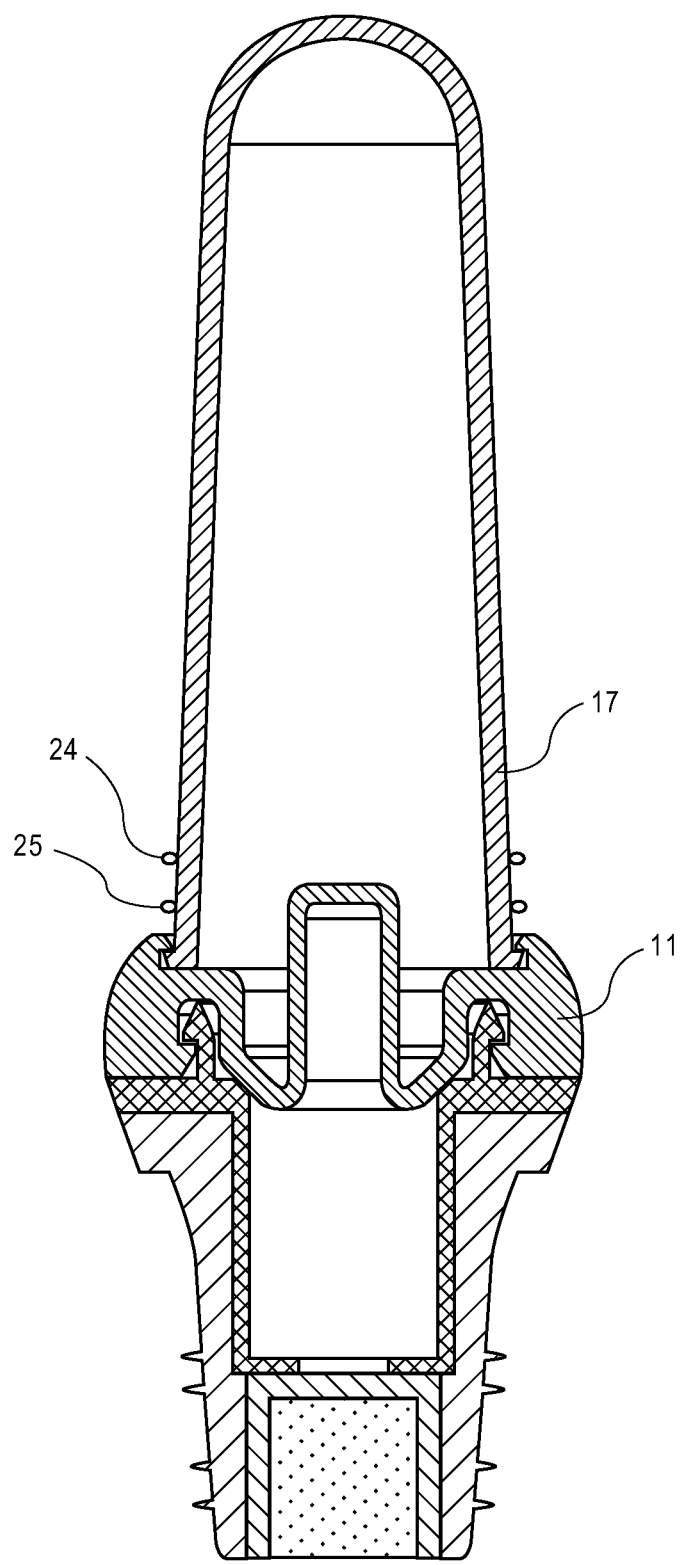
FIG. 3 is a cross sectional view of one embodiment of the closure device of FIG. 1 in an "in use" configuration.

In one embodiment, head portion 11 is sized to reside external to vessel 20 once closure neck 12 has been inserted into vessel 20. When using closure 10 in preserving an item, sealing cap 17 is detached from annular sealing rings 15 of closure neck 12 and closure 10 is inserted into vessel 20. In one embodiment, in order to retain sealing cap 17 while closure 10 is in use, sealing cap 17 is reattached to another part of head portion 11 before (or after) closure 10 is inserted into vessel 20. FIG. 3 illustrates sealing cap 17 being attached to the top of head portion 11.

Removal of sealing cap 17 allows exposure of the atmosphere around closure 10 to the surfaces of cartridge 14. In one embodiment, closure 10 is inserted into vessel neck 13 of vessel 20 securely. In one embodiment, closure 10 comprises annular sealing rings 15 to engage vessel 20 when closure 10 is inserted into vessel 20 and remain engaged while the vacuum is maintained in vessel 20. Closure neck 12 utilizes annular sealing rings 15, which deform as closure neck 12 is inserted within vessel neck 13 of vessel 20, thereby providing for a snug interface substantially preventing gas or liquid from entering or exiting vessel 20 (e.g., a wine bottle) interior between vessel neck 13 and closure neck 12 of closure 10. In another embodiment, annular sealing rings 15 are not an integral part of the closure neck 12. In such a case, other seals may be used such as, for example, but not limited to, a wiping seal, an O-ring seal, a lip seal, or a compression seal. In one embodiment, closure neck 12 shall be constructed of a soft material such as a Thermoplastic Elastomer (TPE) or other material which has low oxygen permeation properties. Note that the seal mechanism can be accomplished in many ways.

Figure 5:
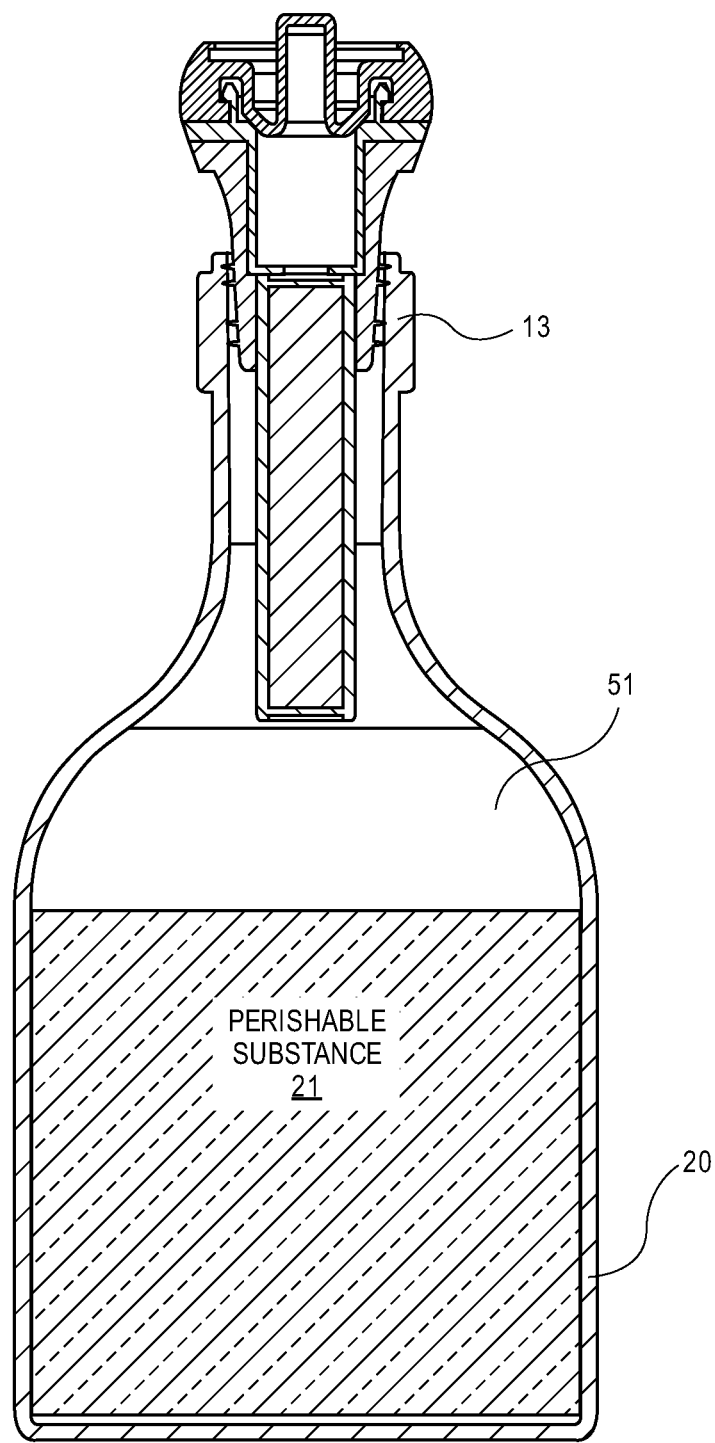
FIG. 5 is a cross sectional view of one embodiment of a closure device installed in a wine bottle in the "in use" configuration.

FIG. 5 illustrates closure 10 inserted into vessel 20. Once secured to vessel 20, the atmosphere of vessel headspace 51 shall contact the surfaces of cartridge 14. Cartridge 14 is filled with canister substance 16 to collect, absorb, consume, neutralize or otherwise render less harmful those substances contained in vessel headspace 51 of vessel 20 which can degrade or negatively impact vessel contents 21 of vessel 20. In one embodiment, the harmful substance comprises oxygen. In another embodiment, the harmful substance comprises aldehydes created by the reaction between the iron oxide and alcohol. In such a case, an additional substance is combined with the oxygen absorber and absorbs these aldehydes. The teachings herein are not limited to oxygen and aldehydes, and other harmful substances may be collected, absorbed, scavenged, or otherwise rendered harmless by canister substance 16.

In one embodiment, the walls of cartridge 14 are constructed such that they retain canister substance 16 but allow molecules from the atmosphere of vessel headspace 51 to pass through and react with canister substance 16. Note that should vessel contents 21 be in contact with the surface of cartridge 14 for any length of time, it is preferable that the material of cartridge 14 be constructed such that vessel contents 21 are not allowed to pass through the walls of cartridge 14 and contact canister substance 16, while still allowing molecules from the atmosphere of vessel headspace 51 to pass through. This type of construction allows vessel contents 21 to never touch canister substance 16 which eliminates the risk of contamination of vessel contents 21 by canister substance 16. Examples of such materials include, but are limited to Porous Plastics from Porex Corporation of Fairburn, Ga., Tyvek, etc.

In one embodiment, the size of cartridge 14 and sealing cap 17 are such that sealing cap 17 may remain covering cartridge 14 while closure 10 is inserted into vessel 20. For example, the size of cartridge 14 and sealing cap 17 are such that sealing cap 17 may remain covering cartridge 14 while closure 10 is inserted into a wine bottle. This allows closure 10 to be used as a wine stopper (without using substance 16) at times. Thereafter, once sealing cap 17 is removed, substance 16 is able to collect harmful molecules, thereby rendering them harmless to the item (e.g., a perishable item) being held in vessel 20 (e.g., by keeping the harmful molecules away from the item).

In one embodiment, there are seals in the form of an annular ring that are included at the top of cartridge 14 (See seals 49 on cage 41 of FIG. 17) that provide additional sealing of cartridge 14. This is particularly useful during manufacturing, particularly handling, in allowing the cap to seal cartridge 14 from the atmosphere outside sealing cap 17 after the cartridge has been filled with substance 16 but is not yet attached or otherwise coupled to the head portion and remainder of closure 10. By capping cartridge 14 at this stage, substance 16 is not depleted prior to attachment to closure 10.

Figure 6:
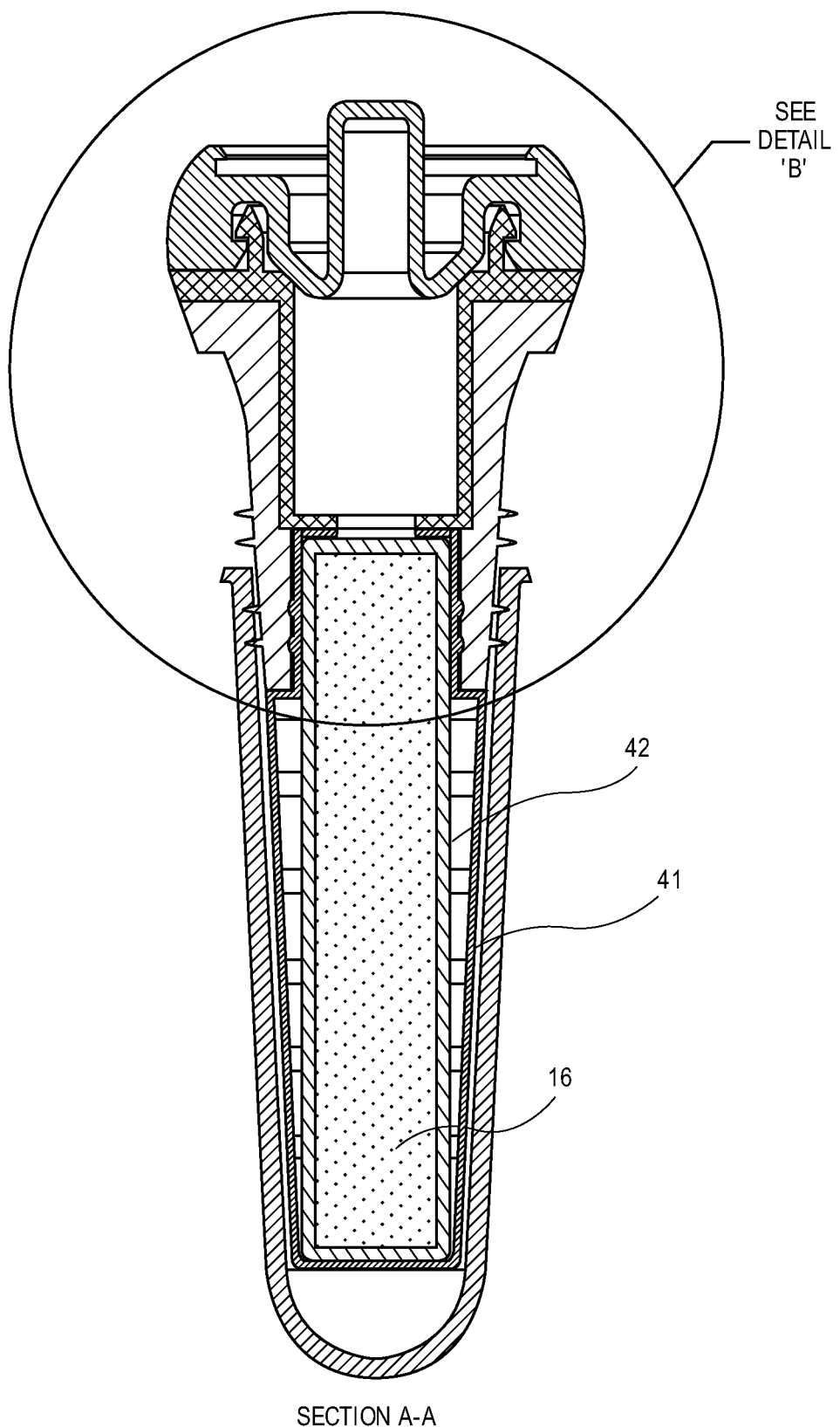
FIG. 6 is a cross sectional view of an alternative embodiment of a closure device in a storage configuration.
Figure 7:
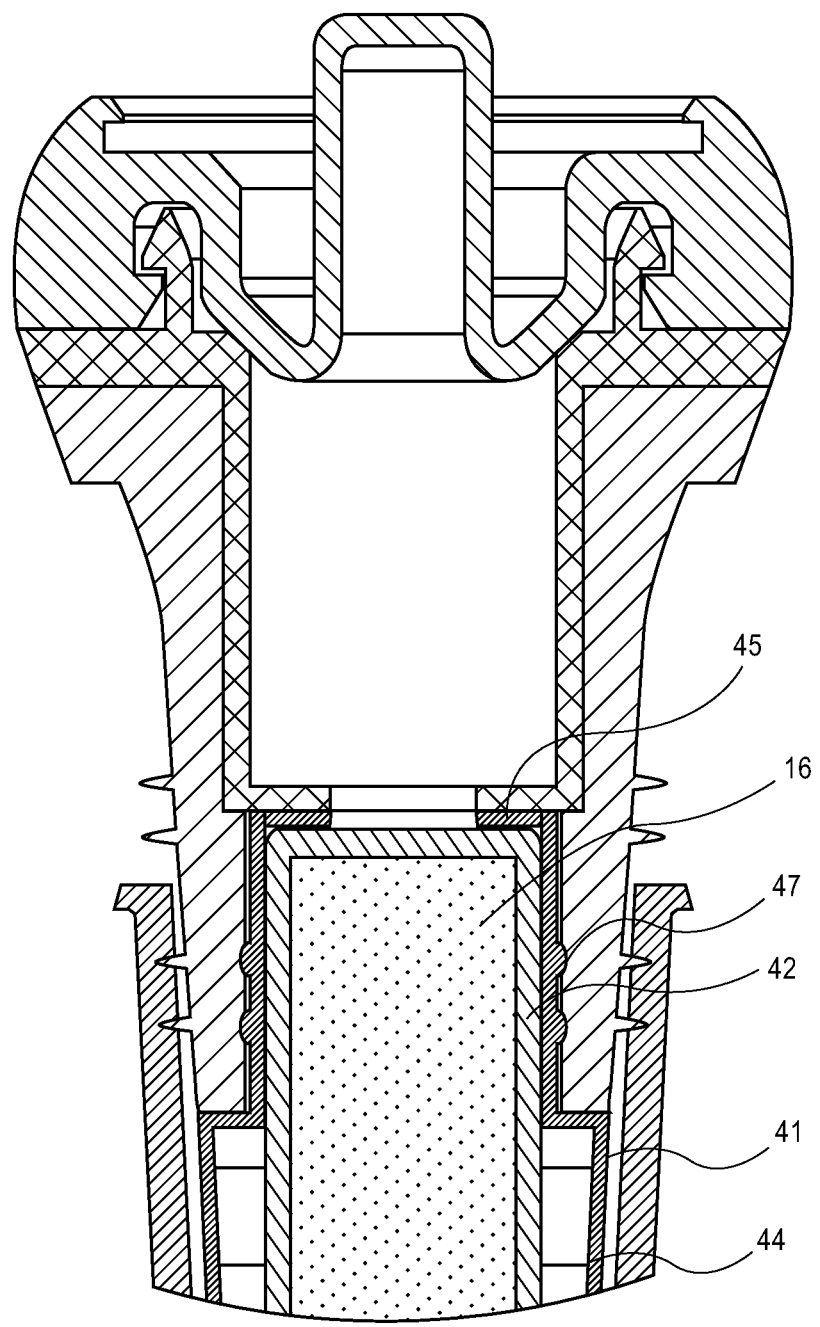
FIG. 7 is detailed cross sectional view of the alternative embodiment of a closure device depicted in FIG. 6.
Figure 9A:
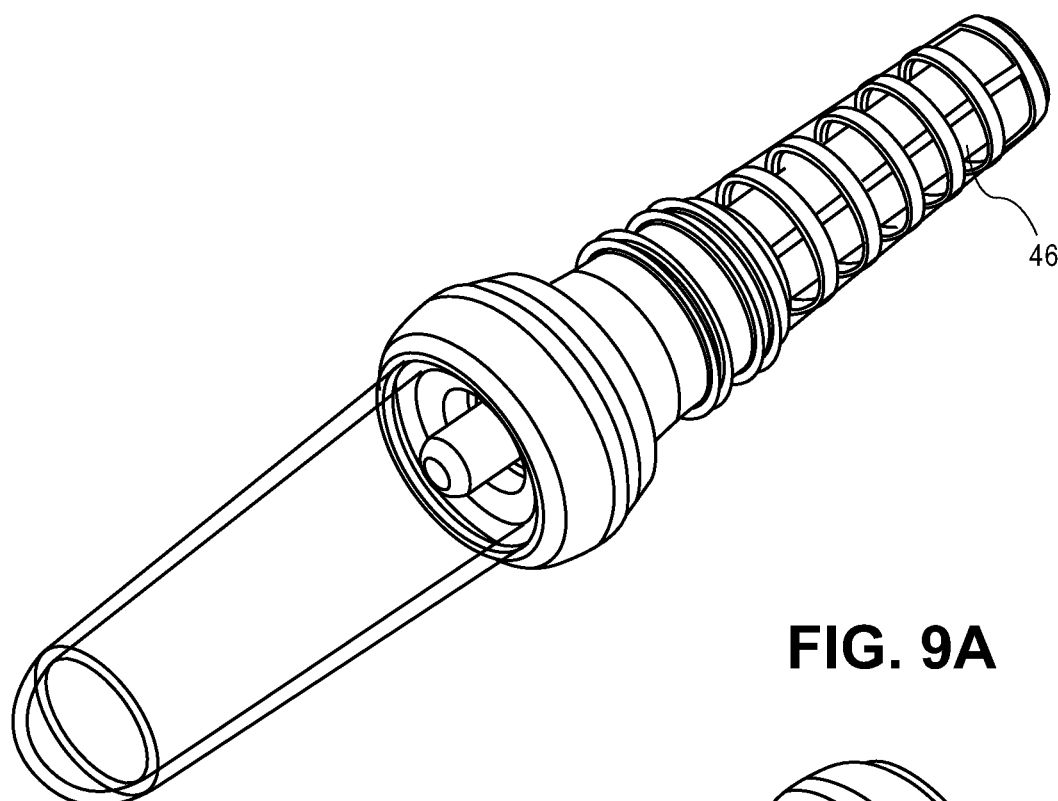
FIGS. 9A and 9B are isometric views of an embodiment of a closure device of FIG. 6 in the "in use" configuration with a sealing cap installed and showing the embodiment in "in use" configuration without a sealing cap installed, respectively.
Figure 9B:
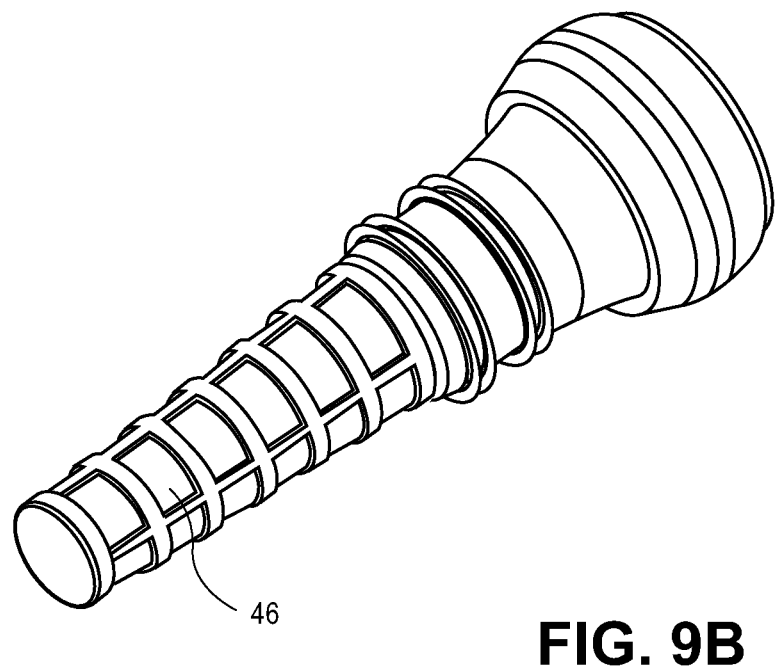

FIGS. 6 and 7 illustrate an alternative embodiment that used a cage canister. FIGS. 9A and 9B are isometric views of an embodiment of a closure device of FIG. 6 in the "in use" configuration with a sealing cap installed and showing the embodiment in "in use" configuration without a sealing cap installed, respectively. Referring to FIGS. 6 and 7, the cartridge is comprised of a cage canister 41, sachet 42 and cage lid 45. In one embodiment, sachet 42 is a flexible packet comprised of flexible porous material 44 and canister substance 16. Flexible material 44 is thin, flexible material with is highly permeable to gases. Sachet 42 is a commercially available package which contains canister substance 16. The edges of sachet 42 are sealed to prevent canister substance 16 from leaking. It is well known in the art that this type of package is very typical for the industry. This type of package provides a low cost solution for containing canister substance 16. In addition, it is also a high performance method of allowing exposure of the atmosphere contained within vessel headspace 51 to react with canister substance 16 due to the ratio of gas permeable flexible material 44 to the amount of contents. Cage canister 41 is designed such that it provides a container (e.g., a rigid container) to house sachet 42. Cage canister 41 is constructed from a material such as a plastic or metal. In one embodiment, the vertical faces of cage canister 41 are designed such that they allow the molecules in vessel headspace 51 to pass through to sachet 42 by incorporating open areas 46 into the design.

During production of cage canister 41, sachet 42 is inserted to cage canister 41. Once inserted in to cage canister 41, sachet 42 is retained within the interior cavity of cage canister 41 by cage lid 45. In one embodiment, cage lid 45 is constructed such that is has a hole in it to allow molecules to pass through. This hole also allows changes in pressure within vessel headspace 51 to be transmitted to the cavity within closure neck 12, to allow for the pressure to be sensed and/or provide a visual indicator to indicate the pressure. This is more fully disclosed in the embodiments described below.

In one embodiment, the amount of time for the canister substance to react with vessel headspace 51 is reduced significantly. Reducing the amount of time for the canister substance and harmful substances to react will decrease the amount of time the perishable item (e.g., wine) is in contact with the harmful substance (e.g., oxygen), thereby improving the quality of preservation.

When in use, cage canister 41 is removably coupled to closure neck 12 to allow cage canister 41 to be installed and then uninstalled for replacement once canister substance 16 has been depleted. In various embodiments, cage canister 41 is removably coupled to closure neck 12 via a snap, thread, press fit, etc.

As discussed above, at least a portion of cartridge 14 comprises a porous material by which the molecules contained in vessel headspace 51 can pass through and reach canister substance 16. As time progresses the harmful substances such as, for example, oxygen react with canister substance 16 and are removed or rendered less harmful.

With closure 10 installed, a negative pressure builds inside bottle due to the oxygen molecules (or other molecules) from vessel headspace 15 chemically reacting with canister substance 16, thereby rendering them harmless. Annular sealing rings 15 are constructed such that they do not leak even with the negative pressure. Additional sealing may be achieved by constructing the sidewall of closure neck 12 such that it substantially interferes with the exterior corner of vessel neck 13 when closure 10 is inserted in to vessel 20. Such negative pressure increases the pressure by which this interference takes places, thus increasing the sealing ability. As oxygen molecules are rendered harmless, the vacuum inside the container (e.g., bottle) increases due to the reduction in molecules. The approximate maximum vacuum will be reached when as many of the molecules contained in vessel headspace 51 has reacted as is chemically possible.

The vessel contents are best preserved to maximum condition when all of the harmful molecules (e.g., oxygen molecules) have been removed from vessel headspace 51 and thus the vacuum within vessel headspace 51 is at its maximum. At this point, vessel contents 21 are at maximum preservation status. Note that that given vessel contents 21, cartridge 14 and canister substance 16, the maximum vacuum achieved is generally very close to the same from sample to sample. Provided that the unused amount of canister substance 16 is such that it is capable of rendering far more oxygen molecules (or other molecules) contained in vessel headspace 51 harmless, the maximum vacuum remains relatively constant despite fluctuations in the amount of vessel contents 21 contained in vessel 20.

Once the period of preservation has been completed, sealing cap 17 is disconnected from head portion 11, closure 10 is then removed from vessel neck 13 and sealing cap 17 is installed over cartridge 14 and over annular sealing rings 15. Annular sealing rings 15 deform as sealing cap 17 is inserted, thus providing for a snug interface substantially preventing gas or liquid from entering or exiting the volume inside sealing cap 17.

The amount of molecules that can react with canister contents 16 is thus turned off and limited to what is left in the volume enclosed by sealing cap 17. This effectively turns off the chemical reactions taking place inside canister contents 16 allowing the unused portion of canister contents 16 to be used at a later time. When preserving many perishable substances or liquids, the bulk of the degradation of vessel contents 21 takes place during the time in which the percentage of harmful molecules goes from maximum to minimum (such as below 0.1%). For example, in the case of harmful oxygen molecules, the initial concentration within vessel headspace 51 could be 20.9% by volume. During use, the oxygen percentage will drop below 0.1% after several hours. Most of the degradation takes place while the oxygen percentage drops from 20.9% to below 0.1%. With many perishable substances, it is best to minimize this time. Under many circumstances, the amount of time is directly related to the amount of canister contents 16 contained in cartridge 14 and by maximizing the permeability of the walls of cartridge 14. By using a very large cartridge 14, the overall time can be reduced to a minimum. To produce a large cartridge 14, the diameter and length can be varied as compared to small version. However, buy using a large cartridge 14, the cost to produce a larger version of cartridge 14 is more than a smaller version of cartridge 14. Thus, the retail price for a large cartridge 14 would be higher than a small version.

If sealing cap 17 is not used, canister contents 16 of the large cartridge 14 will be rendered ineffective in a short time period when closure 10 is not in use and exposed to open air. This results in a very high cost for a single use higher performance (lower time) version. By using a sealing cap 17, the larger cartridge 14 can be used yielding a higher performance (lower time) and also be able to reuse it many more times. For the consumer, the use of sealing cap 17, thus resulting in higher performance and lower cost per use. The higher cost for the large cartridge 14 is then amortized over many uses which results in a much lower cost per use. Furthermore, cartridge 14 shall be secured to closure neck 12 such that it can be replaced with a fresh cartridge 14 when the old cartridge 14 is depleted.

It is very beneficial that closure 10 can remove harmful substances such as oxygen molecules by simple insertion into vessel neck 13 and without any additional devices such as a vacuum pump or the insertion of an inert gas.

Closure Device with Indicators

In one embodiment, the closure device includes indicator to indicate information regarding a state of the portion of the first container sealed by the removable closure. In one embodiment, the indicator comprises a visual indicator (e.g., one or more lights or LEDs). In another embodiment, the indicator comprises an audio indicator. In one embodiment, the information provided by the indicator indicates oxygen is being or has been rendered harmless by the substance. In one embodiment, the information indicates that the removable enclosure is not engaged with the first container adequately. In one embodiment, the information indicates whether the removable enclosure is working properly.

In one embodiment, the preservation apparatus further comprises an indicator to indicate the portion of the first container sealed by the removable closure is at a vacuum pressure that has reached a predetermined amount. In one embodiment, the visual indicator comprises a top portion coupled to the second container that is movable in response to changes in vacuum pressure in the sealed portion of the first container. In one embodiment, the top portion includes an open area between the removable closure and the top portion to enable pressure within the first container to be transferred to an interior of the top portion to cause displacement of the top portion. In one embodiment, the top portion becomes flush with another portion of the removable closure in response to the vacuum pressure in the sealed portion of the first container reaching a predetermined amount. In one embodiment, the preservation apparatus comprises registration marks for use in indicating an amount of displacement of the top portion due to the changes in vacuum pressure.

In one embodiment, the preservation apparatus further comprises a visual indicator to indicate information regarding a state of the portion of the first container sealed by the removable closure, wherein the removable closure further comprises a transparent top portion to enable viewing of the visual indicator.

In one embodiment, the removable closure further comprises a pressure sensor; and an indicator coupled to the pressure sensor to provide an indication based on one or more pressure values from the pressure sensor. In one embodiment, the indication provided by the indicator indicates, based on the pressure values, that the removable closure is not properly engaged with the first container. In another embodiment, the indication indicates, based on the pressure values, the substance needs to be replaced. In one embodiment, the indication indicates at least one of a group consisting of: preservation status is improving within the portion of the first container sealed by the removable closure, preservation status is not improving within the portion of the first container sealed by the removable closure, the substance needs to be replaced, and the portion of the container sealed by the removable closure has reached a maximum vacuum. In one embodiment, the indication comprises a flashing or non-flashing lights of particular colors to set forth different states of the portion of the first container sealed by the removable closure.

As set forth above, during use of closure 10, the vacuum pressure increases as the molecules inside vessel 20 are rendered harmless. To indicate the decrease in pressure inside the bottle, one or more different indicators may be used to provide feedback to a user. These indicators may be visual or audio. Possible embodiments that provide visually indications indicative of the decrease in pressure include, but are not limited to, those described below.

Referring to FIGS. 1-10, closure 10 is shown having a visual indicator 18. Referring to FIGS. 1-10, as the vacuum increases, a negative pressure increases on the inside surface of visual indicator 18. In one embodiment, visual indicator 18 is constructed such that a difference in pressure between inside and outside surfaces causes visual indicator 18 to be displaced. The displacement of visual indicator 18 indicates visually whether or not the canister substance 16 is still good and serving its function. It also can indicate when vessel headspace 51 is at maximum vacuum, and thus preservation status of vessel contents 21 is at its maximum.

Figure 8:
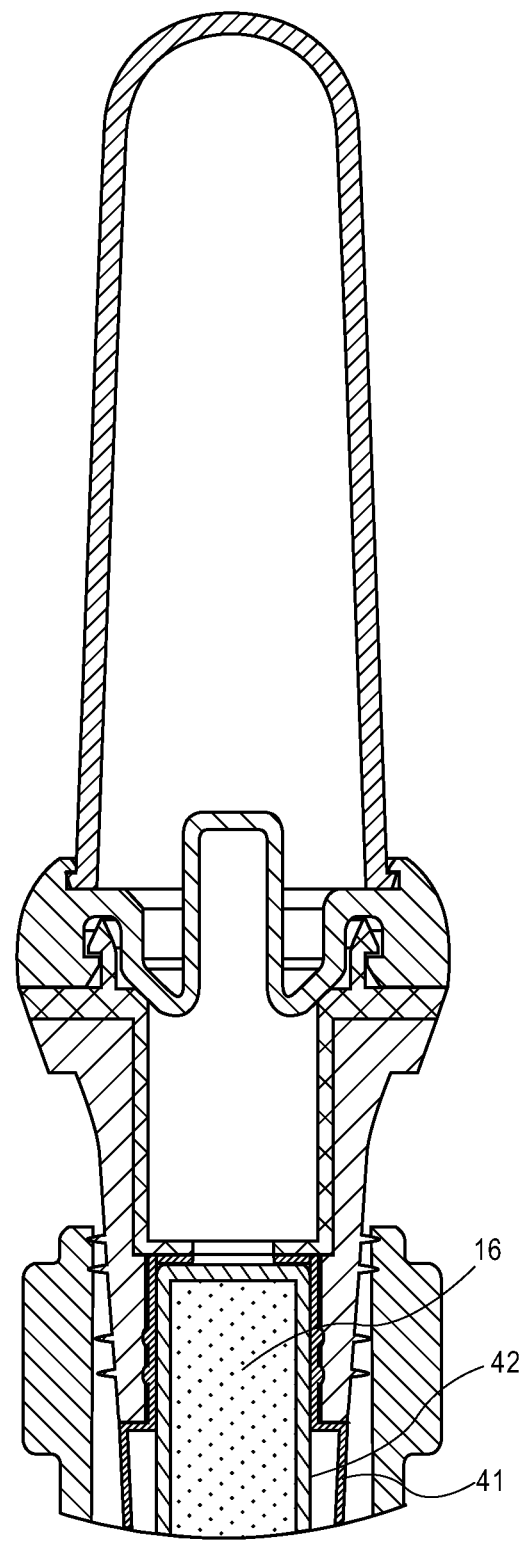
FIG. 8 is a cross sectional view of the alternative embodiment of a closure device of FIG. 6 in the "in use" configuration.
Figure 10:
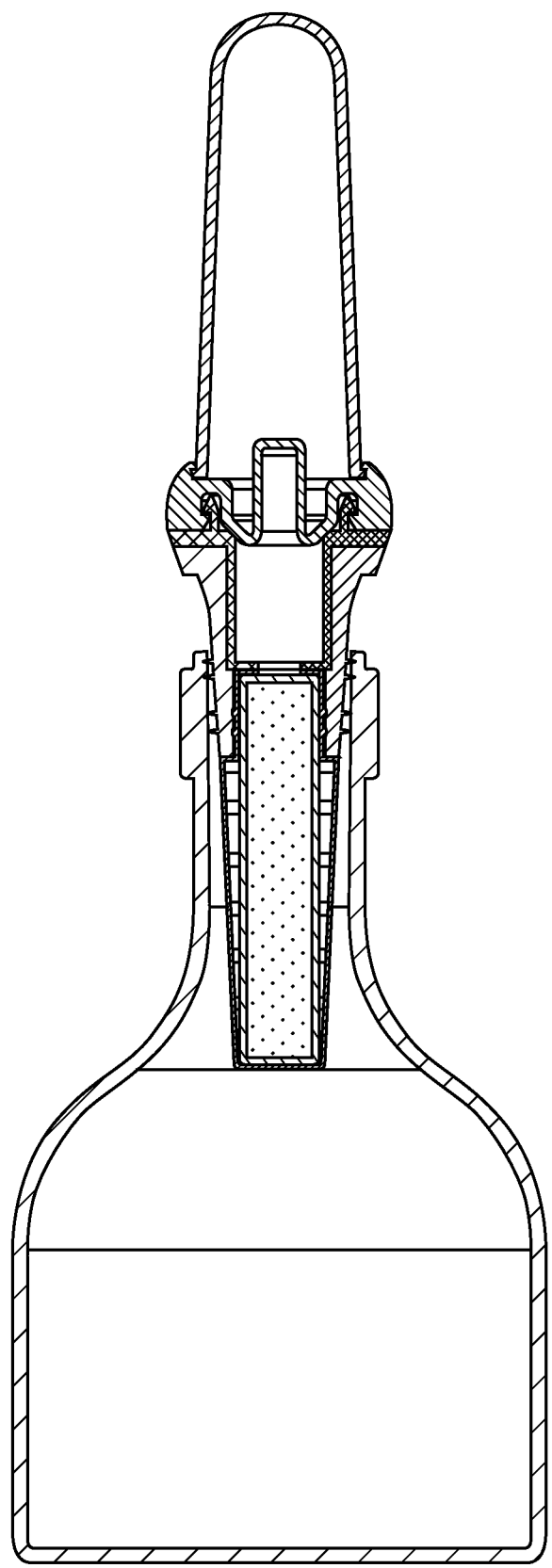
FIG. 10 is a cross sectional view of one embodiment of a closure device installed in a wine bottle in the "in use" configuration.

During use, sealing cap 17 is stored by connecting to head portion 11. In this embodiment, sealing cap 17 could be constructed of a clear material such that the position of visual indicator 18 can be seen. This is shown in FIGS. 8 and 10.

Figure 4A:
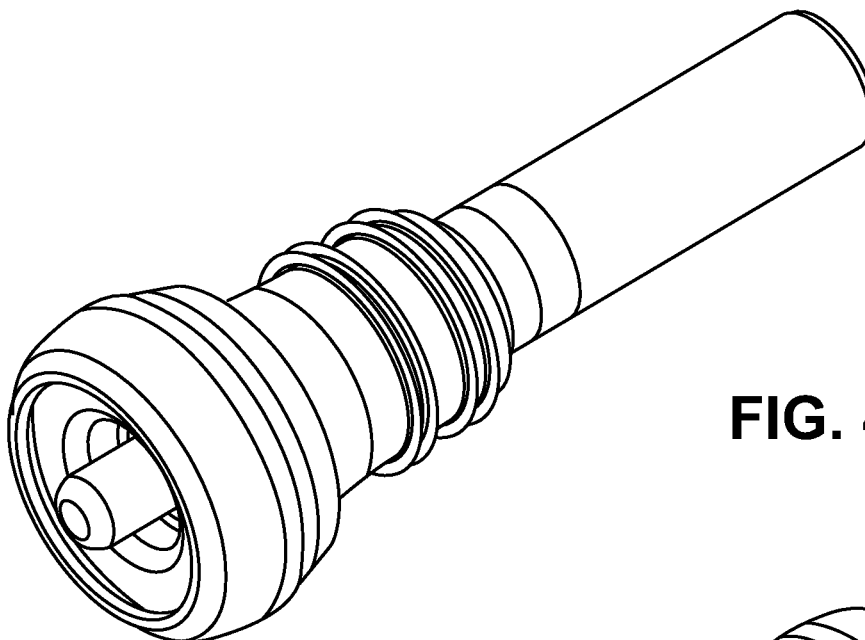
FIGS. 4A and 4B illustrate isometric views of one embodiment of the closure device.
Figure 4B:
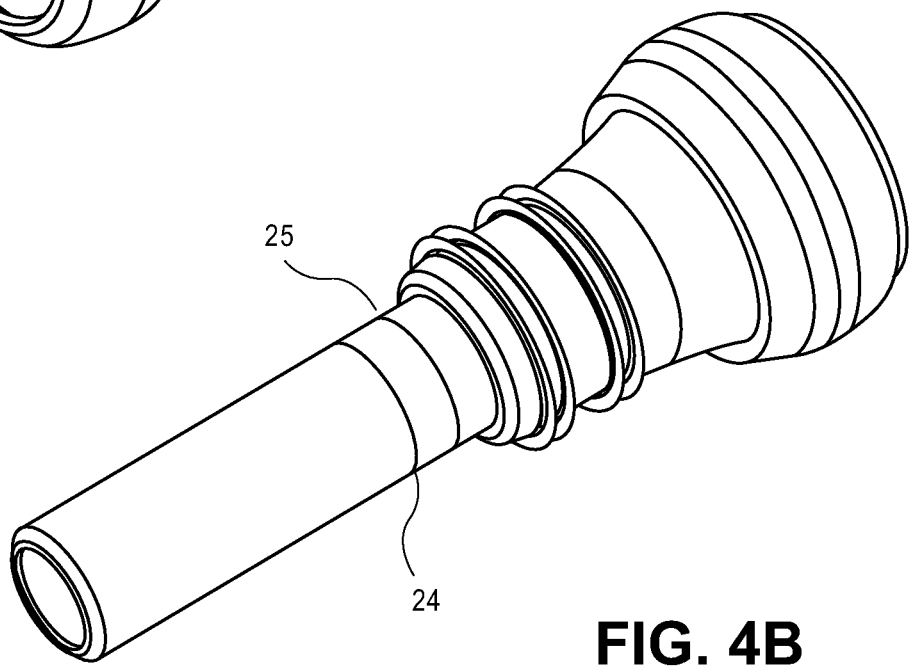

FIGS. 4A and 4B illustrate isometric views of one embodiment of the closure device that includes a visual indicator. Referring to FIGS. 4A and 4B, visual registration lines 24 and 25 are included on sealing cap 17 in order to provide the registrations marks to visually compare the position of the top surface of visual indicator 18. In one embodiment, upper registration line 24 indicates the container into which closure 10 has been inserted has no vacuum, and thus no preservation is occurring, and lower registration line 25 indicates a maximum vacuum (or other predetermined amount), and thus maximum preservation is occurring.

Figure 16:
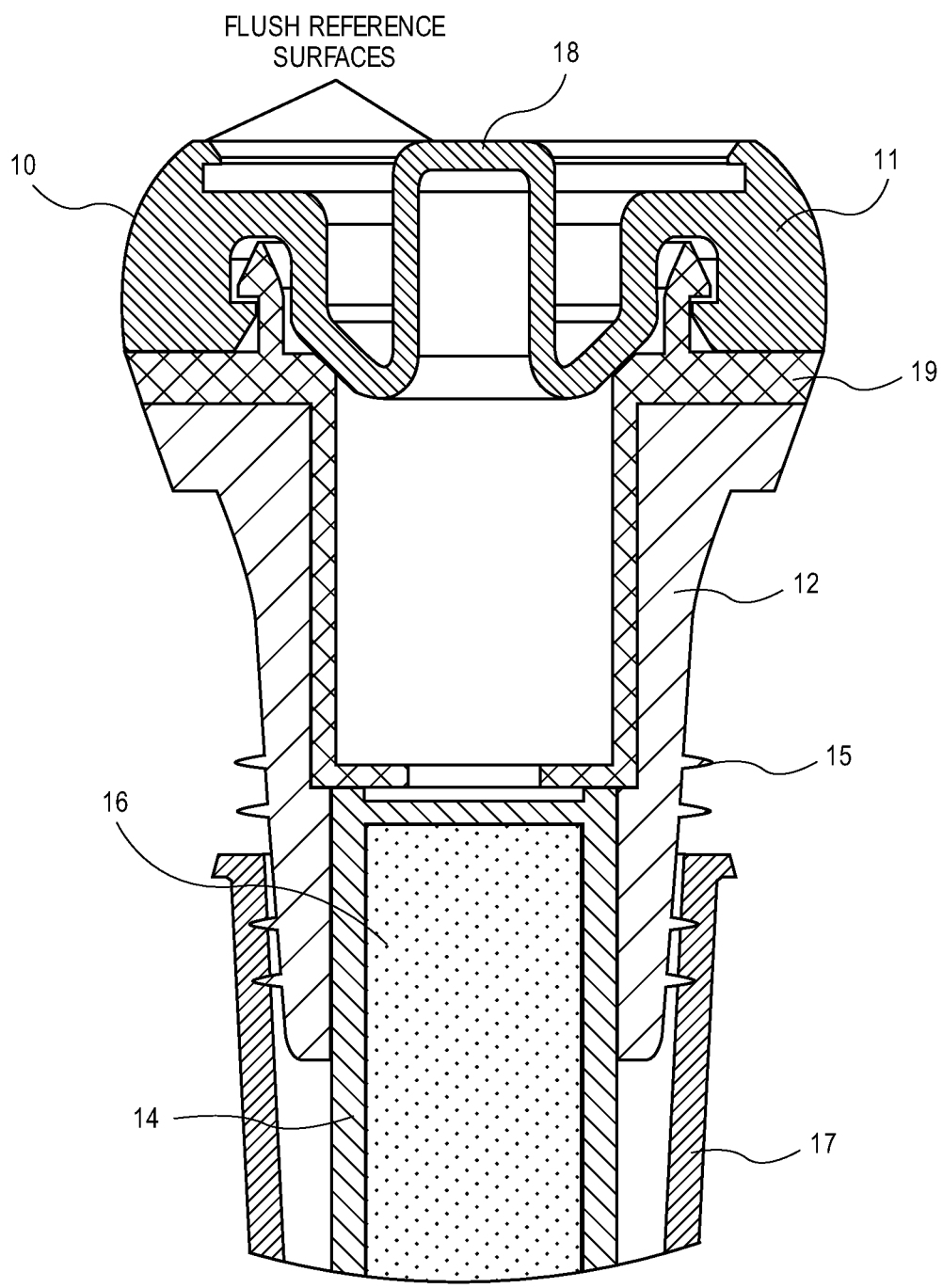
FIG. 16 illustrates one embodiment of the closure device having a manual indicator that becomes flush with a surface of the closure device.

In another embodiment, the displacement of visual indicator 18 is such that the top portion of the visual indicator becomes flush with another portion of the removable closure (e.g., the remaining top of the removable closure) in response to the vacuum pressure in the sealed portion of vessel 20 reaching a predetermined amount (e.g., maximum pressure). FIG. 16 illustrates one embodiment of the closure device having a manual indicator that becomes flush with a surface of the closure device.

Figure 11:
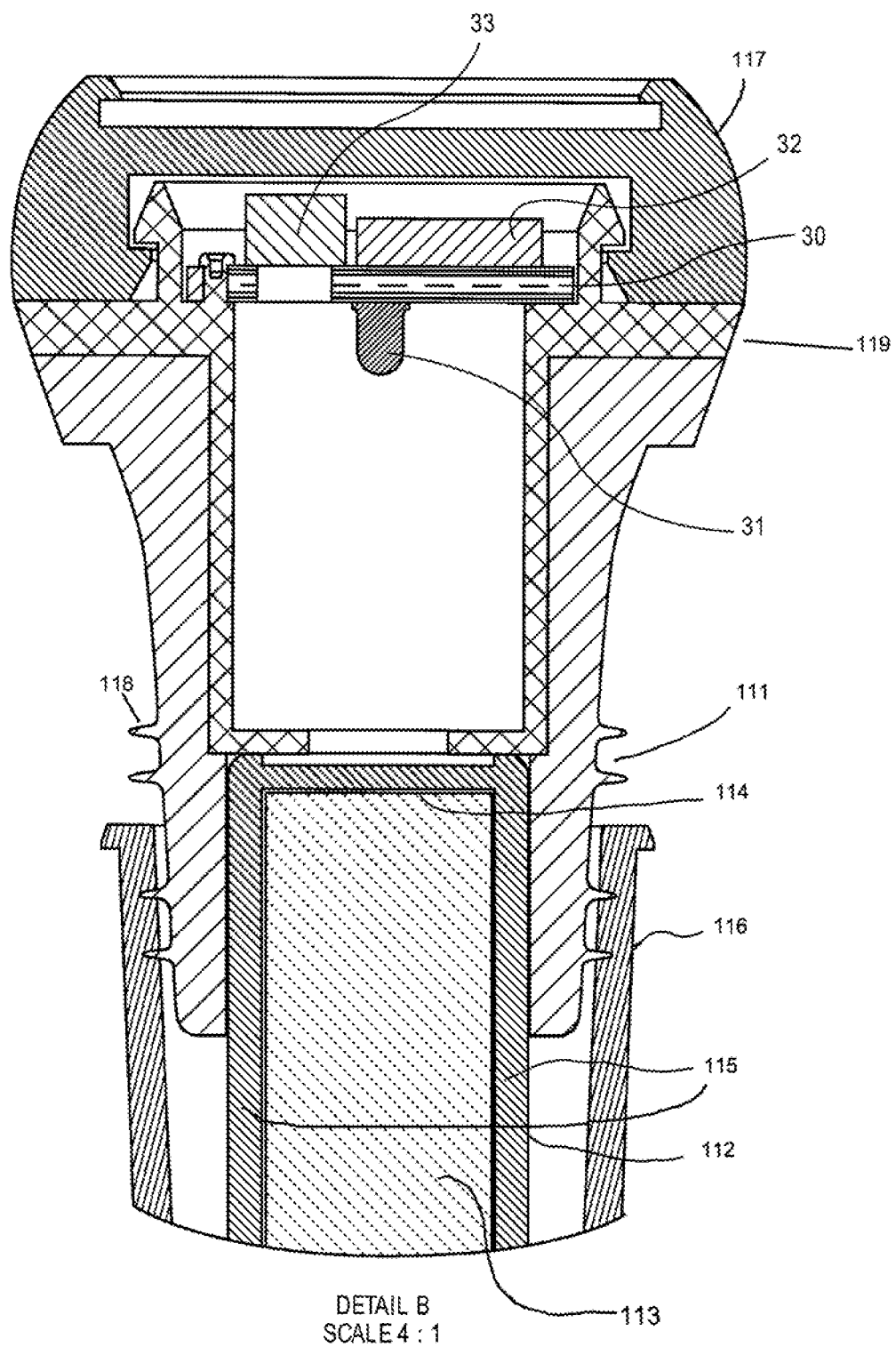
FIG. 11 is detailed cross sectional view of an alternative embodiment of a closure device having electronics.
Figure 12:
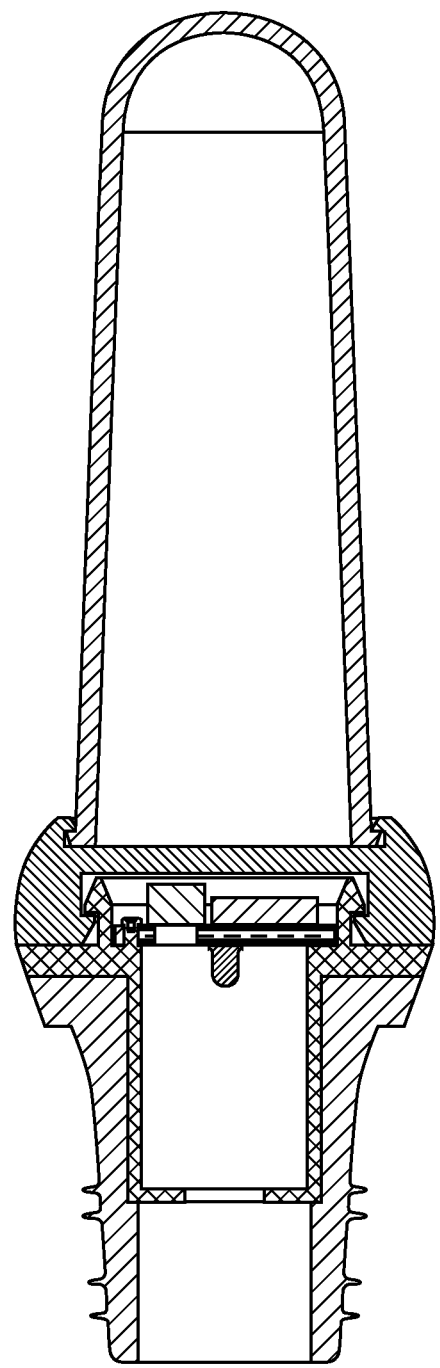
FIG. 12 is a cross sectional view of alternative embodiment of a closure device having electronics in the "in use" configuration.

FIGS. 11 and 12 illustrate an alternative embodiment of a closure device having electronics. Referring to FIGS. 11 and 12, during use of the closure device, the vacuum pressure increases as the molecules inside vessel 20 are rendered harmless due to chemical reactions. In one embodiment, closure 10 is configured with a printed circuit board assembly (PCBA) 30 that includes a pressure sensor 33, a power source 32 (e.g., a battery) a light source 31 (e.g., light emitting diode (LED)), and a controller (not shown to avoid obscuring the present invention) that controls these components. In addition, PCBA 30 may contain discrete components to aid in the performance of tasks as needed.

As shown in FIG. 11, a removable closure comprises a head portion 117, a neck portion 111, annual sealing rings 118, and a structural support 119 adapted to fit together in sealed relationship with a first container for containing an item (not shown), the removable closure comprising a second container 112 to contain a substance 113 operable to collect oxygen molecules contained within the first container, the second container including a top portion 114 adapted to couple to the neck portion, a bottom portion (not shown) adapted to be above the item in the first container (not shown), and walls 115 extending from the top portion to the bottom portion, wherein the sidewall is configured to pass through the oxygen molecules to react with the substance, wherein the removable closure comprises light source 31 coupled to the neck portion 111 to provide a visual indication that the substance 113 needs to be replaced; and a removable cap 116 adapted to cover a portion of the removable closure including the second container 112, in order to prevent the second container from being exposed to oxygen molecules outside the cap.

As the vacuum increases, pressure sensor 33 senses the pressure within closure 10. This is the same pressure as is in vessel 20. Based on the pressure readings from sensor 33, PCBA 30 then determines the level of pressure and illuminate light source 31 accordingly. In one embodiment, the light is carried to the edge of closure 10 by structural support 19 or another mechanism which is made from clear material acting as a light pipe. In one embodiment, light source 31 is located such that it requires no light pipe. In one embodiment, light source 31 is oriented such that it illuminates sealing cap 17 when it is attached to sealing cap 17 during use. This can make for a very special visual effect that is aesthetically pleasing. The change in pressure can be directly related to the status of preservation inside vessel 20. The lower the pressure, the better the quality of preservation in general. PCBA 30 has sufficient circuitry to monitor the pressure and illuminate light source 31 according to predefined conditions. In one embodiment, example conditions include, but are not limited to, the following:

| Condition | Vessel Pressure Level | Light Source Function |
| --- | --- | --- |
| Preservation Status Improving | Decreasing | Flash Green |
| Preservation Status Not Improving | Does not decrease | Flash Red |
| cartridge 10 needs to be replaced | Decreased too slowly | Solid Red |
| Preservation Status has reached maximum | Reached maximum | Solid Green |

An Example a Food Container

Figure 13:
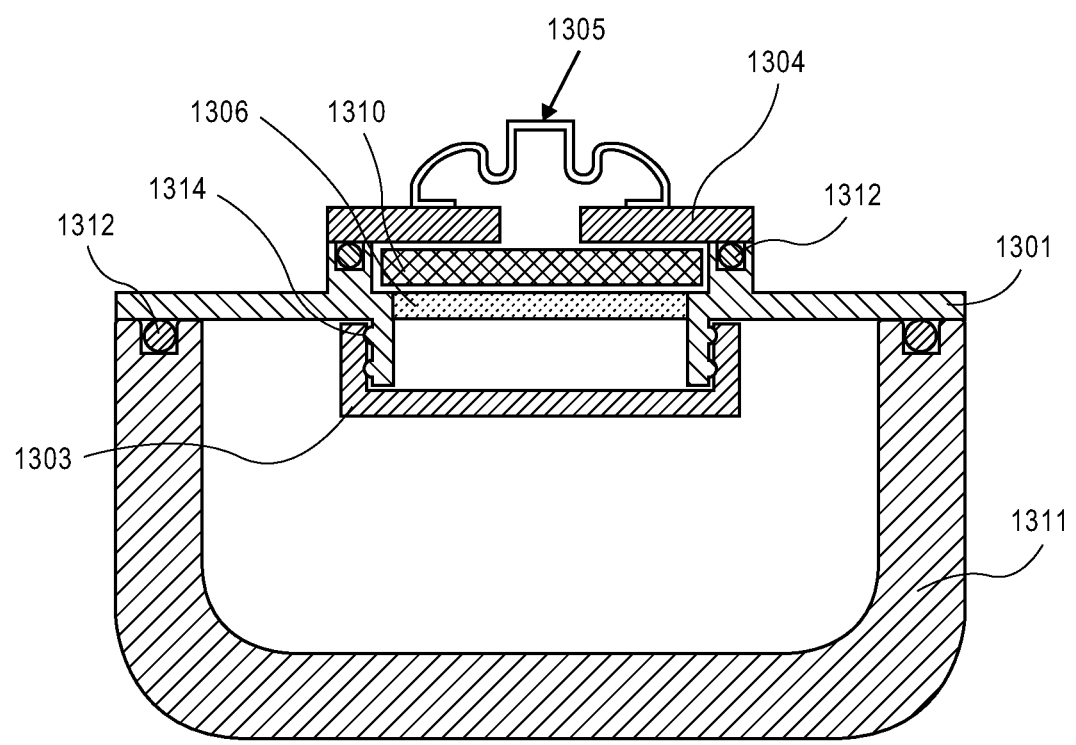
FIG. 13 illustrates a cross sectional view of another alternative embodiment in which the closure device is integrated into a lid of a container.
Figure 14:
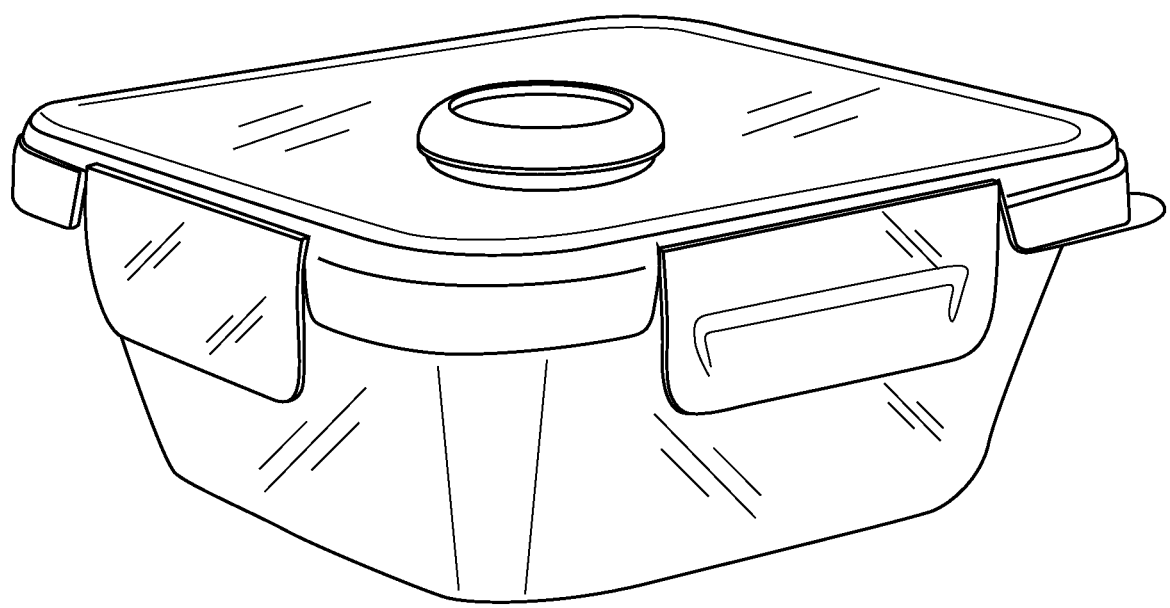
FIG. 14 illustrates a perspective view of the container having a lid with an integrated closure device.

In one embodiment, the preservation apparatus is integrated into a container, such as, for example, a food container. FIGS. 13 and 14 illustrate embodiments of such containers. Referring to FIG. 13, container 1311 has a lid 1301 that is used to seal the contents of container 1311. Lid 1301 includes a substance container 1302 that includes a packet 1310 that includes a substance to render harmful molecules (e.g., oxygen molecules) harmless through a chemical reaction. Packet 1310 is contained in a compartment 1302 that has a top 1304. Top 1304 includes an indicator 1305 for use as a visual indicator that includes spring portions and operates similarly to the spring based visual indicator described above. Top 1304 may be opened to insert packet 1310 for use in preserving the contents of container 1311. Top 1304 is also opened to replace packet 1310 with a new packet when packet 1310 no longer includes a substance that can be used to render harmful molecules harmless.

The container also includes a cap 1303 that covers an opening in the lid that is used to allow harmful molecules to interact with the substance in packet 1310 through porous plastic or other suitable material 1306 (e.g., Tyvek or others described above) when cap 1303 is removed. Cap 1303 engages with integrated extensions of lid 1301 that include annular sealing rings 1314.

A number of seals 1312 are include to create to prevent the external atmosphere from entering into portions of container 1311 and/or lid 1301.

FIG. 14 illustrates a perspective view of a food container with a lid having an integrated preservation apparatus such as shown in FIG. 13.

Note that the embodiments of FIGS. 13 and 14 may include one or more of the indicators described above, including the indicators disclosed above.

An Example Process for Using a Preservation Apparatus

Figure 15:
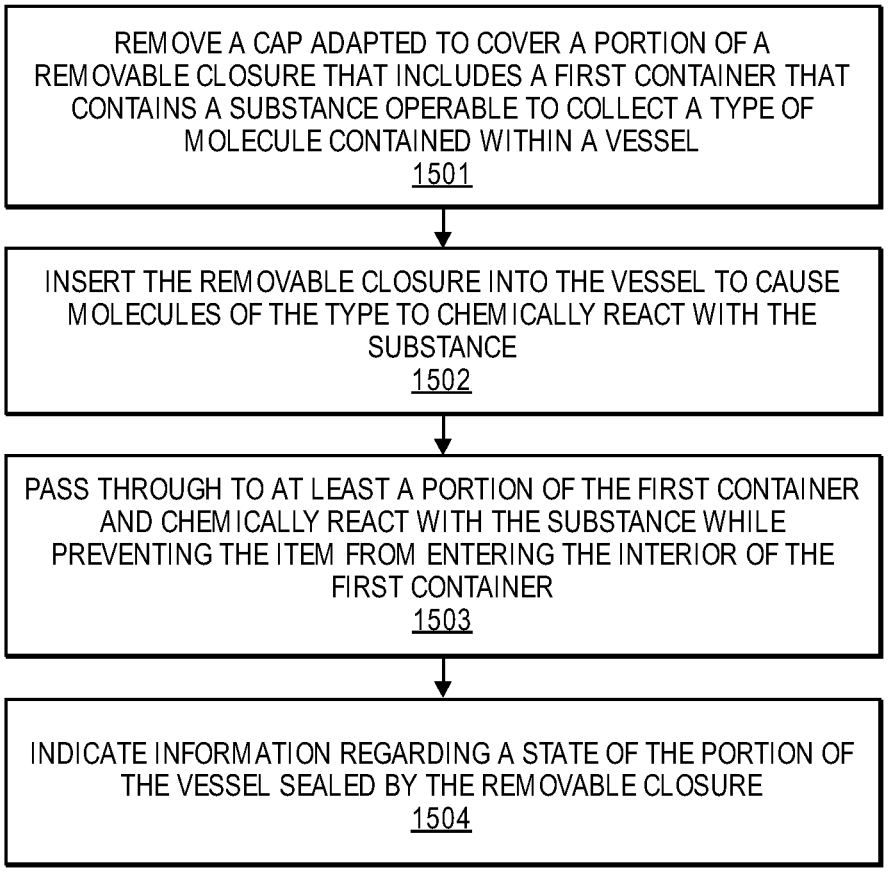
FIG. 15 illustrates one embodiment of a process for using a preservation apparatus.

FIG. 15 illustrates one embodiment of a process for using a preservation apparatus. Referring to FIG. 15, the process begins by removing a cap adapted to cover a portion of a removable closure that includes a first container that contains a substance operable to collect a type of molecule contained within a vessel (block 1501) and inserting the removable closure into the vessel to cause molecules of the type to chemically react with the substance (block 1502).

After insertion of the closure device into a vessel, molecules of the type (e.g., oxygen molecules) pass through to at least a portion of the first container and chemically react with the substance while preventing the item from entering the interior of the first container (block 1503).

Next, an indicator on the closure device indicates information regarding a state of the portion of the vessel sealed by the removable closure (block 1504). The indicator may be any of the indicator discussed herein including, but not limited to, visual and audio indicators.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A preservation apparatus comprising:
a removable closure comprising
a head portion, and a neck portion adapted to fit together in sealed relationship with a first container for containing an item, the removable closure comprising a second container that is insertable into the first container, wherein the second container is removably coupled with the removable closure, wherein the second container contains a substance operable to collect oxygen molecules contained within the first container, the second container including a top portion adapted to couple to the neck portion, a bottom portion adapted to be above the item in the first container, and walls extending from the top portion to the bottom portion, wherein the material of each of at least a part of the top portion, the bottom portion and at least one of the walls of the second container is a porous plastic that is configured to allow the oxygen molecules pass through the at least one of the porous plastic walls, the porous plastic top portion and the porous plastic bottom portion and chemically react with the substance and to prevent the item in the first container from passing through the at least one of the porous plastic walls, the porous plastic top portion and the porous plastic bottom portion to enter the interior of the second container when the second container comes in contact with the item,
wherein the removable closure comprises a light source coupled to the neck portion to provide a visual indication to indicate a pressure change; and
a removable cap adapted to cover a portion of the removable closure including the second container, in order to prevent the second container from being exposed to oxygen molecules outside the cap.

2. The preservation apparatus defined in claim 1 wherein the porous material comprises porous plastic or Tyvek.

3. The preservation apparatus defined in claim 1 wherein the substance includes an aldehyde absorber.

4. The preservation apparatus defined in claim 1 wherein the pressure change indicates a change in an amount of the oxygen molecules within a first portion of the first container sealed by the removable closure.

5. The preservation apparatus defined in claim 1 wherein the second container is operable to be removably coupled to the removable closure.

6. The preservation apparatus defined in claim 1 wherein the light source is configured to indicate information regarding a state of the portion of the first container sealed by the removable closure.

7. The preservation apparatus defined in claim 6 wherein the removable closure further comprising a controller coupled to the light source.

8. The preservation apparatus defined in claim 7 wherein the light source comprises one or more lights.

9. The preservation apparatus defined in claim 1 wherein the visual indication is to indicate that a vacuum pressure has reached a predetermined level that is related to a predetermined amount of the oxygen molecules within a first portion of the first container sealed by the removable closure.

10. The preservation apparatus defined in claim 1 wherein the removable closure further comprises:
a pressure sensor coupled to the light source.

11. The preservation apparatus defined in claim 10 wherein the visual indication indicates, based on pressure values determined by the pressure sensor, that the removable closure is not properly engaged with the first container.

12. The preservation apparatus defined in claim 1 wherein the cap is adapted for coupling to the removable closure when the removable closure is in sealed relationship with the first container in a manner that prevents oxygen in the first container from chemically reacting with the substance.

13. The preservation apparatus defined in claim 12 wherein the first container comprises a bottle.

14. The preservation apparatus defined in claim 10 wherein the visual indication indicates, based on the pressure change, that an amount of the oxygen molecules within a first portion of the first container sealed by the removable closure has reached a predetermined amount and the substance needs to be replaced.

15. The preservation apparatus defined in claim 10 wherein the visual indication indicates, based on the pressure change, at least one of a group consisting of:
preservation status associated with an amount of the oxygen molecules within the portion of the first container sealed by the removable closure is improving, preservation status associated with the amount of the oxygen molecules within the portion of the first container sealed by the removable closure is not improving, the amount of the oxygen molecules within a first portion of the first container sealed by the removable closure has reached a predetermined amount and the substance needs to be replaced.

16. The preservation apparatus defined in claim 15 wherein the visual indication comprises a flashing or non-flashing lights of particular colors to set forth different states of the portion of the first container sealed by the removable closure.

17. The preservation apparatus defined in claim 1 wherein the removable closure is sized to fit within a neck of the first container.

18. The preservation apparatus defined in claim 1 wherein the removable closure comprises annular sealing rings to engage the first container when the removable closure is inserted into the first container and remain engaged while the vacuum is being created in the first container.

19. The preservation apparatus defined in claim 1 wherein the item comprises one selected from a group consisting of a beverage, wine, cooking oil, beer, and spirits.

20. The preservation apparatus defined in claim 1 wherein the substance is packaged in a sachet within the second container, and further wherein the removable closure includes a top portion removably coupled to the second container for use in replacing the sachet.

21. A preservation apparatus comprising:
a removable closure comprising a head portion, a neck portion, annual sealing rings, and a structural support adapted to fit together in sealed relationship with a first container for containing an item, the removable closure comprising a second container that is insertable into the first container, wherein the second container is removably coupled with the removable closure, wherein the second container contains a substance operable to collect a type of molecule contained within the first container, the second container including a top portion adapted to couple to the neck portion, a bottom portion adapted to be above the item in the first container, and walls extending from the top portion to the bottom portion, wherein the material of each of at least a part of the top portion, the bottom portion and at least one of the walls of the second container is a porous plastic that allows molecules of the type to pass through the at least one of the porous plastic walls, the porous plastic top portion and the porous plastic bottom portion and chemically react with the substance while preventing the item in the first container from passing through the at least one of the porous plastic walls, the porous plastic top portion and the porous plastic bottom portion and entering the interior of the second container when the second container comes in contact with the item;
a light source coupled to the neck portion to provide a visual indication to indicate a pressure change; and
a removable cap adapted to cover a portion of the removable closure including the second container, in order prevent the second container from being exposed to molecules of the type outside the cap.

22. The preservation apparatus defined in claim 21 wherein the material comprises porous plastic or Tyvek.

23. The preservation apparatus defined in claim 21 wherein the substance collects oxygen molecules and absorbs at least one other type of molecule.

24. The preservation apparatus defined in claim 21 wherein the pressure change indicates a change in an amount of the oxygen molecules—within a first portion of the first container sealed by the removable closure.

25. The preservation apparatus defined in claim 21 wherein the second container is operable to be removably coupled to the removable closure.

26. The preservation apparatus defined in claim 21 wherein the visual indication is to indicate, based on the pressure change, that an amount of the oxygen molecules within a first portion of the first container sealed by the removable closure has reached a predetermined amount.

* * * * *